US011021106B2

(12) United States Patent
Pohl

(10) Patent No.: US 11,021,106 B2
(45) Date of Patent: Jun. 1, 2021

(54) VEHICLE, SIDE MIRROR ASSEMBLY FOR A VEHICLE, AND METHODS THEREOF

(71) Applicant: Intel Corporation, Santa Clara, CA (US)

(72) Inventor: Daniel Pohl, Puchheim (DE)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 15/939,365

(22) Filed: Mar. 29, 2018

(65) Prior Publication Data

US 2019/0047473 A1  Feb. 14, 2019

(51) Int. Cl.
 *B60R 1/074* (2006.01)
 *G08G 1/16* (2006.01)
 *B60R 1/12* (2006.01)
(52) U.S. Cl.
 CPC .............. *B60R 1/074* (2013.01); *B60R 1/12* (2013.01); *G08G 1/16* (2013.01); *B60R 2001/1223* (2013.01); *B60R 2001/1253* (2013.01); *B60Y 2400/3017* (2013.01); *B60Y 2400/405* (2013.01); *B60Y 2400/4185* (2013.01)
(58) Field of Classification Search
 USPC ........................................................ 701/49
 See application file for complete search history.

(56) References Cited

U.S. PATENT DOCUMENTS

| 6,204,753 | B1* | 3/2001 | Schenk | B60R 1/062 |
|---|---|---|---|---|
| | | | | 340/435 |
| 2011/0141593 | A1* | 6/2011 | Kanning | B60R 1/025 |
| | | | | 359/843 |
| 2015/0310281 | A1* | 10/2015 | Zhu | G06K 9/00805 |
| | | | | 382/104 |
| 2016/0070265 | A1* | 3/2016 | Liu | G01C 21/00 |
| | | | | 701/3 |
| 2017/0158136 | A1* | 6/2017 | Garcia Solache | B60R 1/074 |

OTHER PUBLICATIONS

Woodyard, "Broken mirror? Prices soar for high-tech car parts", USA Today, Nov. 18, 2013, retrieved on Apr. 20, 2018.
Cunningham, "BMW ditches mirrors for a safer side-view camera system", CNET, Jan. 5, 2016, retrieved on Apr. 20, 2018.

* cited by examiner

*Primary Examiner* — Aniss Chad
*Assistant Examiner* — Mahmoud M Kazimi
(74) *Attorney, Agent, or Firm* — Viering, Jentschura & Partner mbB

(57) ABSTRACT

According to various aspects, a vehicle may include: an external structure; an assembly configured to allow a movement of at least a part of the assembly relative to the external structure at least from a first position to a second position, wherein the assembly protrudes from the external structure with a first distance in the first position and with a second distance less than the first distance in the second position; one or more sensors configured to receive obstacle information associated with one or more obstacles in a vicinity of the vehicle; one or more processors configured to determine a collision threat to the assembly based on the obstacle information, and trigger the movement of at least the part of the assembly from the first position into the second position in the case that the collision threat is determined.

20 Claims, 13 Drawing Sheets

VEHICLE, SIDE MIRROR ASSEMBLY FOR A VEHICLE, AND METHODS THEREOF

TECHNICAL FIELD

Various aspects relate generally to a vehicle, a side mirror assembly for a vehicle, and methods thereof, e.g., to a method for avoiding collision of one or more obstacles with an assembly attached to an external structure of a vehicle and to a method for operating a vehicle.

BACKGROUND

In general, modern vehicles may include various active and passive assistance systems to assist during driving the vehicle. As an example, an emergency brake assist (EBA), also referred to as brake assist (BA or BAS) may be implemented in the vehicle. The emergency brake assist may include a braking system that increases braking pressure in an emergency. The emergency may be a predicted collision of the vehicle with another vehicle or with a fixed object, as for example, a wall, a tree, etc. The vehicle may include one or more sensors and one or more processors that are configured to predict a frontal collision of the vehicle with an obstacle. Further, a vehicle may include a parking assistance system, wherein parking sensors (e.g., proximity sensors) are used to sense obstacles in a vicinity of the vehicle while parking. Further, one or more autonomous vehicle maneuvering systems may be implemented in a vehicle, e.g., to move the vehicle into a parking position, to more or less autonomously drive the vehicle, etc.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1A:
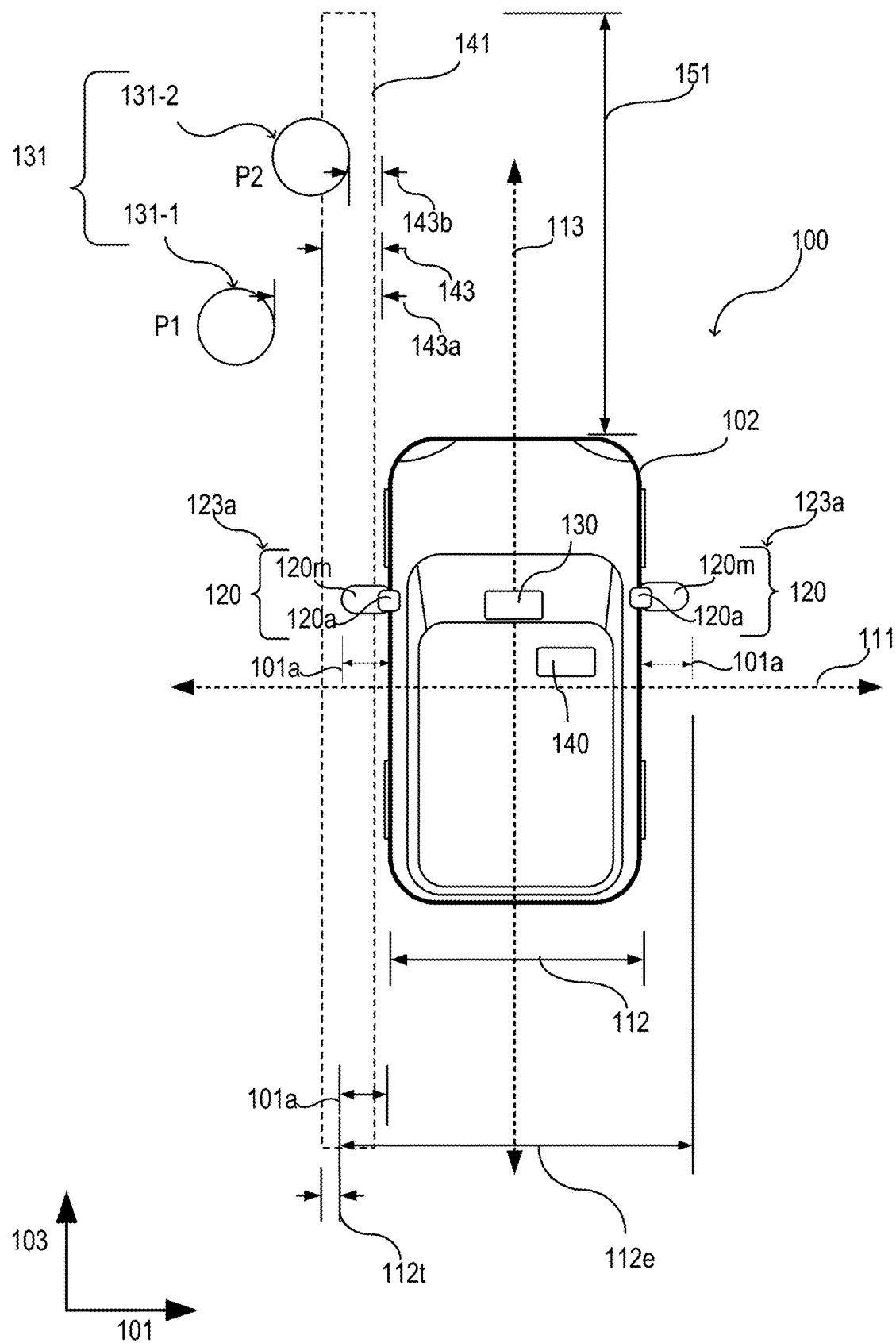
FIG. 1A and FIG. 1B show an exemplary vehicle including a collision threat prediction with respect to an assembly of the vehicle, according to some aspects.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The terms "processor" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. The term "handle" or "handling" as for example used herein referring to data handling, file handling or request handling may be understood as any kind of operation, e.g., an I/O operation, and/or any kind of logic operation. An I/O operation may include, for example, storing (also referred to as writing) and reading.

A processor may thus be or include an analog circuit, digital circuit, mixed-signal circuit, logic circuit, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Differences between software and hardware implemented data handling may blur. A processor, controller, and/or circuit detailed herein may be implemented in software, hardware and/or as hybrid implementation including software and hardware.

The term "system" (e.g., a computing system, a memory system, a storage system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The term "mechanism" (e.g., a spring mechanism, etc.) detailed herein may be understood as a set of interacting elements, wherein the elements can be, by way of example and not of limitation, one or more mechanical components, one or more electrical components, one or more instructions, etc.

As used herein, the term "memory", "memory device", and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

According to various aspects, information (e.g., obstacle information) may be handled (e.g., processed, analyzed, stored, etc.) in any suitable form, e.g., data may represent the information and may be handled via a computing system.

The term "map" used with regards to a two- or three-dimensional map may include any suitable way of describing positions of objects in the two- or three-dimensional space. According to various aspects, a voxel map may be used to describe objects in the three dimensional space based on voxels associated with objects. To prevent collision based on a voxel map, ray-tracing, ray-casting, rasterization, etc., may be applied to the voxel data.

In some aspects, one or more range imaging sensors may be used for sensing objects in a vicinity of a vehicle. A range imaging sensor may allow associating range information (or in other words distance information or depth information) with an image, e.g., to provide a range image having range data associated with pixel data of the image. This allows, for example, providing a range image of the vicinity of the vehicle including range information about one or more objects depicted in the image. The range information may include, for example, one or more colors, one or more shadings associated with a relative distance from the range image sensor, etc. According to various aspects, position data associated with positions of objects relative to the vehicle and/or relative to an assembly of the vehicle may be determined from the range information. According to various aspects, a range image may be obtained, for example, by a stereo camera, e.g., calculated from two or more images having a different perspective. Three-dimensional coordinates of points on an object may be obtained, for example, by stereophotogrammetry, based on two or more photographic images taken from different positions. However, a range image may be generated based on images obtained via other types of cameras, e.g., based on time-of-flight (ToF) measurements, etc. Further, in some aspects, a range image may be merged with additional sensor data, e.g., with sensor data of one or more radar sensors, etc.

As an example, a range image may include information to indicate a relative distance of objects displayed in the image. This distance information may be, but is not limited to, colors and/or shading to depict a relative distance from a sensor. Based on (e.g. a sequence of) range images, a three dimensional map may be constructed from the depth information. Said map construction may be achieved using a map engine, which may include one or more processors or a non-transitory computer readable medium configured to create a voxel map (or any other suitable map) from the range information provided by the range images. According to various aspects, a moving direction and a velocity of a moving object, e.g. of a moving obstacle approaching a vehicle, may be determined via a sequence of range images considering the time at which the range images where generated.

One or more aspects are related to a vehicle. The term "vehicle" as used herein may be understood as any suitable type of vehicle, e.g., a motor vehicle also referred to as automotive vehicle. As an example, a vehicle may be a car also referred to as a motor car, a passenger car, etc. As another example, a vehicle may be a truck (also referred to as motor truck), a van, etc. However, despite various aspects may be described herein for motor vehicles (e.g., a car, a truck, etc.), a vehicle may also include any type of ships, drones, airplanes, tracked vehicles, etc.

In general, many new car models are following the trend of becoming larger and larger. Even the same category of car models seems to grow in width, e.g., for a mid-size passenger car from about 170 cm in 1993 to about 180 cm in 2014. Cars like SUVs (SUV, Sport Utility Vehicle) are becoming more and more popular, again consuming more space on the streets, e.g., SUVs may have a width of about 200 cm.

Besides that trend, streets are not necessarily getting wider, especially in many cities downtown, because of how old buildings are laid out, streets cannot be changed easily to become wider. It may happen, for example, to parked cars that their side mirror has been ripped off by another car. Therefore, car manufacturers already reacted and the side mirrors in many modern cars may be slowly retracted by an electric motor after the car has been locked in its parking position.

Modern car side mirrors may contain a great amount of technology and, therefore, may be pricey to replace. As an example, a side mirror may include a heater to avoid fogging and ice formation on the mirror, a control and motor for the electric changing of the mirror angles, a system enabling the saving of the angles in the memory system of the car, a camera to detect blind spots, a turn signal, etc. Given all that technology in a side mirror, if one is lost by a collision (e.g., by another car ripping it off or by driving too close to an obstacle), the costs can be quiet high. A replacement of a lower-tech side mirror may cause, for example, costs in the range from about 250 $ to about 350 $. However, a replacement of a high-tech side mirror that may be, for example, power-adjusted, heated, have a built in turn signal, have two panes to aid towing, etc., the replacement costs may be higher than about 1,000 $.

According to various aspects, a system is provided that may prevent such damage during driving, e.g., to prevent a collision of an obstacle (e.g., of another car, of a side mirror of another car, etc.) with the side mirror (or any other attachment assembly) of the car.

In some cases, a car may not have side mirrors. In this case, a camera may be mounted at the corresponding position instead of the side mirror. However, there may be still the risk that an object may come too close and breaks the camera off.

In various aspects, a depth camera (or any other range image device) may be used, for example, aligned in forward driving direction (e.g., integrated into the side mirror facing in forward driving direction) to detect during driving if another vehicle or obstacle may come too close and would cause a collision with at least the side mirror. In such a case, a spring-based mechanism may be used to throw the mirror within a fraction of a second into its retracted parking position or into any other suitable safety position. Once the situation is safe again, the mirror may slowly move out again (e.g., using a motor) to its original position. In a similar way, at least one depth camera (or any other range image device) may be used, for example, that is aligned in rear driving direction to avoid a collision in the case that an obstacle approaches the side mirror from this direction.

Various aspects may refer to a collision avoidance system to protect one or more assemblies attached to a vehicle. As an example, a collision avoidance system is provided to protect one or two side mirror assemblies of a motor vehicle, e.g., of a car, a truck, etc. This avoids, for example, high replacement costs of the assembly, e.g., of a side mirror assembly. The collision avoidance system may be based on one or more range image sensors (e.g., one or more depth sensors, e.g., one or more depth cameras) that may be integrated into the car forward facing side of a side mirror. However, other positions of the vehicle may be used to integrate the one or more range image sensors.

The collision avoidance system may further include a computing system. The computing system may include one or more processors, one or more memories, etc. The computing system may be communicatively coupled to the one or more sensors of the vehicle to obtain and analyze sensor data generated by the one or more sensors. According to some aspects, the one or more processors may be configured to generate depth images in real-time from the data received from the one or more range image sensors. The depth images may have a pixel resolution of less than about 200 pixels in each direction. However, according to various aspects, the depth image may be generated (e.g., updated) at a high frequency, e.g., at a frequency of more than about 60 Hz, e.g., more than about 100 Hz.

According to various aspects, the one or more range image sensors may have a fixed position, e.g., at the side mirror, so that it can be efficiently calculated if an object that is approaching would very likely hit the side mirror. The situation that an object approaching the assembly would very likely hit the assembly may be referred to herein as a collision threat.

According to various aspects, a vehicle may include an external structure and one or more assemblies attached to the external structure. Each of the one or more assemblies may include an attachment structure to attach the respective assembly to the external structure. The attachment structure may be configured to allow a movement of at least a part of the respective assembly relative to the external structure at least from a first position to a second position, wherein the respective assembly protrudes from the external structure with a first distance in the first position and with a second distance less than the first distance in the second position. In other words, the assembly may have a first dimension if at least the part of the assembly is in the first position and a second dimension that is less than the first dimension if at least the part of the assembly is in the second position. The vehicle may further include one or more sensors configured to receive obstacle information associated with a location of one or more obstacles in a vicinity of the vehicle. The vehicle may further include one or more processors configured to predict a collision threat to the assembly based on the obstacle information, and to trigger the movement of at least the part of the assembly from the first position into the second position in the case that the collision threat is predicted.

In the following, a motor vehicle is illustrated and described exemplarily as the vehicle, wherein two side mirror assemblies of the motor vehicle may be illustrated and described exemplarily as the at least one assembly of the vehicle. However, other types of vehicles may be provided including the same or similar structures and functions as described exemplarily for the motor vehicle. Further, the vehicle may include any other type of assembly that is configured in the same or similar way as described exemplarily for the respective side mirror assembly.

Figure 1B:
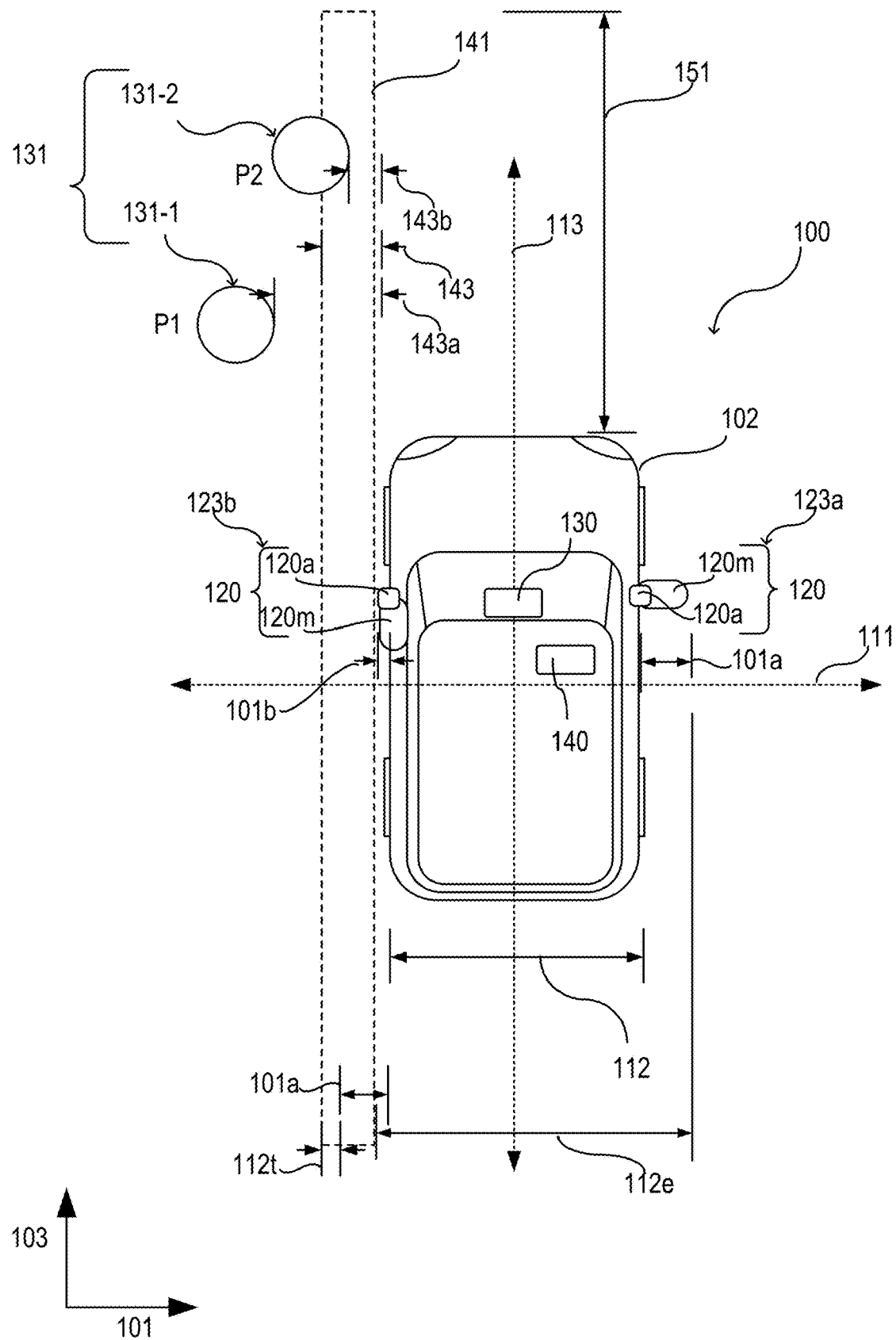
Figure 1C:
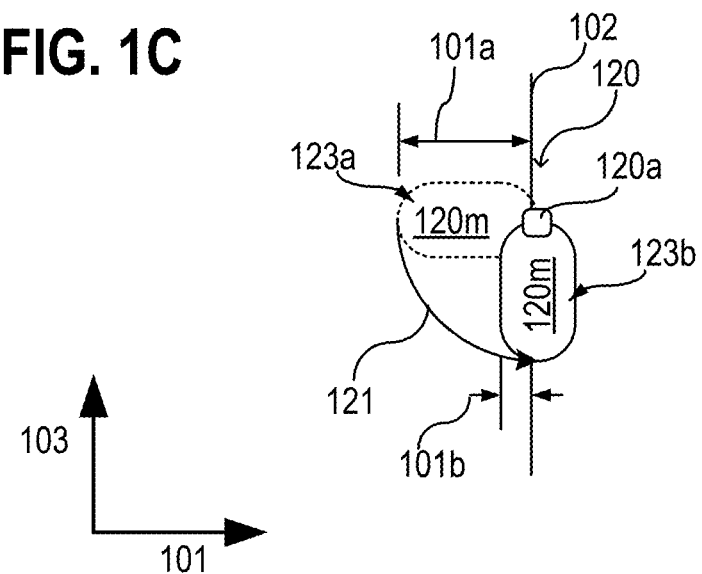
FIG. 1C shows an exemplary assembly of a vehicle in a more detailed view, according to some aspects.

FIG. 1A and FIG. 1B illustrate a vehicle 100, e.g., a motor vehicle, in two schematic views, according to various aspects. The vehicle 100 may include an external structure 102 and at least one assembly 120 attached to the external structure 102. FIG. 1C illustrates the assembly 120, e.g., a side mirror assembly 120, of the vehicle 100 in a schematic view, according to various aspects.

According to various aspects, the assembly 120 may include an attachment structure 120*a* to attach the assembly 120 to the external structure 102. The attachment structure 120*a* may be configured to allow a movement 121 of at least a part 120*m* of the assembly 120 relative to the external structure 102 at least from a first position 123*a* to a second position 123*b*, wherein the assembly 120 protrudes from the external structure 102 with a first distance 101*a* in the first position 123*a* and with a second distance 101*b* less than the first distance 101*a* in the second position 123*b*. In other words, at least a part 120m of the assembly 120 may be movably mounted to the external structure 102 to move at least the part 120m of the assembly 120 from a first position 123a to a second position 123b, wherein the assembly 120 protrudes from the external structure 102 with a first distance 101a in the first position 123a and with a second distance 101b less than the first distance 101a in the second position 123b.

According to various aspects, the vehicle 100 may further include one or more sensors 130 configured to receive obstacle information associated with a location of one or more obstacles 131 in a vicinity of the vehicle 100. Further, the vehicle 100 may include one or more processors configured to predict a collision threat to at least the part 120m of the respective assembly 120 based on the obstacle information, and trigger the movement 121 of at least the part 120m of the respective assembly 120 from the first position 123a into the second position 123b in the case that the collision threat is predicted.

The vehicle 100 may be a motor vehicle including two side mirror assemblies, e.g., the assembly 120 may be a first side mirror assembly at a first (e.g., the drivers) side of the vehicle 100 or a second side mirror assembly at a second side of the vehicle 100. As an example, the motor vehicle (e.g., a car, a truck, etc.) may include a body and/or a chassis forming the external structure 102. The external structure 102 may be at least part of an external skin that defines the outer dimensions of the vehicle 100. The external structure 102 may have a maximum width 112.

In some aspects, the vehicle 100 may define a longitudinal axis 113. The longitudinal axis 113 may be associated with a forward driving direction (e.g., illustratively in direction 103 as illustrated in FIG. 1A and FIG. 1B) and/or a rear driving direction (e.g., illustratively opposite to the direction 103). Further, the vehicle 100 may define a lateral axis 111 perpendicular to the longitudinal axis 113. A width (e.g., the maximum width 112) of the vehicle 100 may be determined parallel to the lateral axis 111 (e.g., illustratively parallel to direction 101 and perpendicular to direction 103).

Figure 5A:
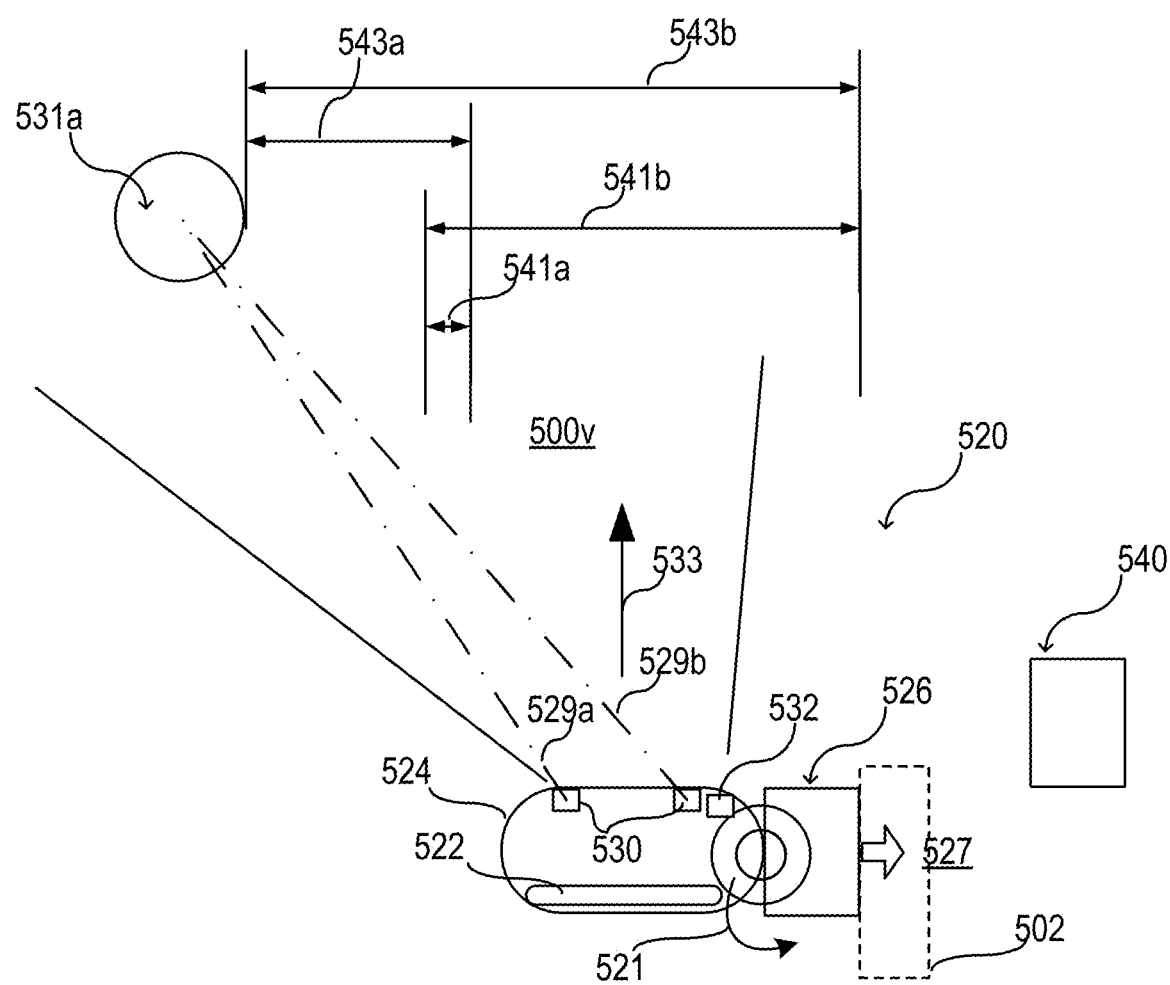
FIGS. 5A and 5B show an exemplary side mirror assembly including one or more range imaging sensors, according to some aspects.
Figure 5B:
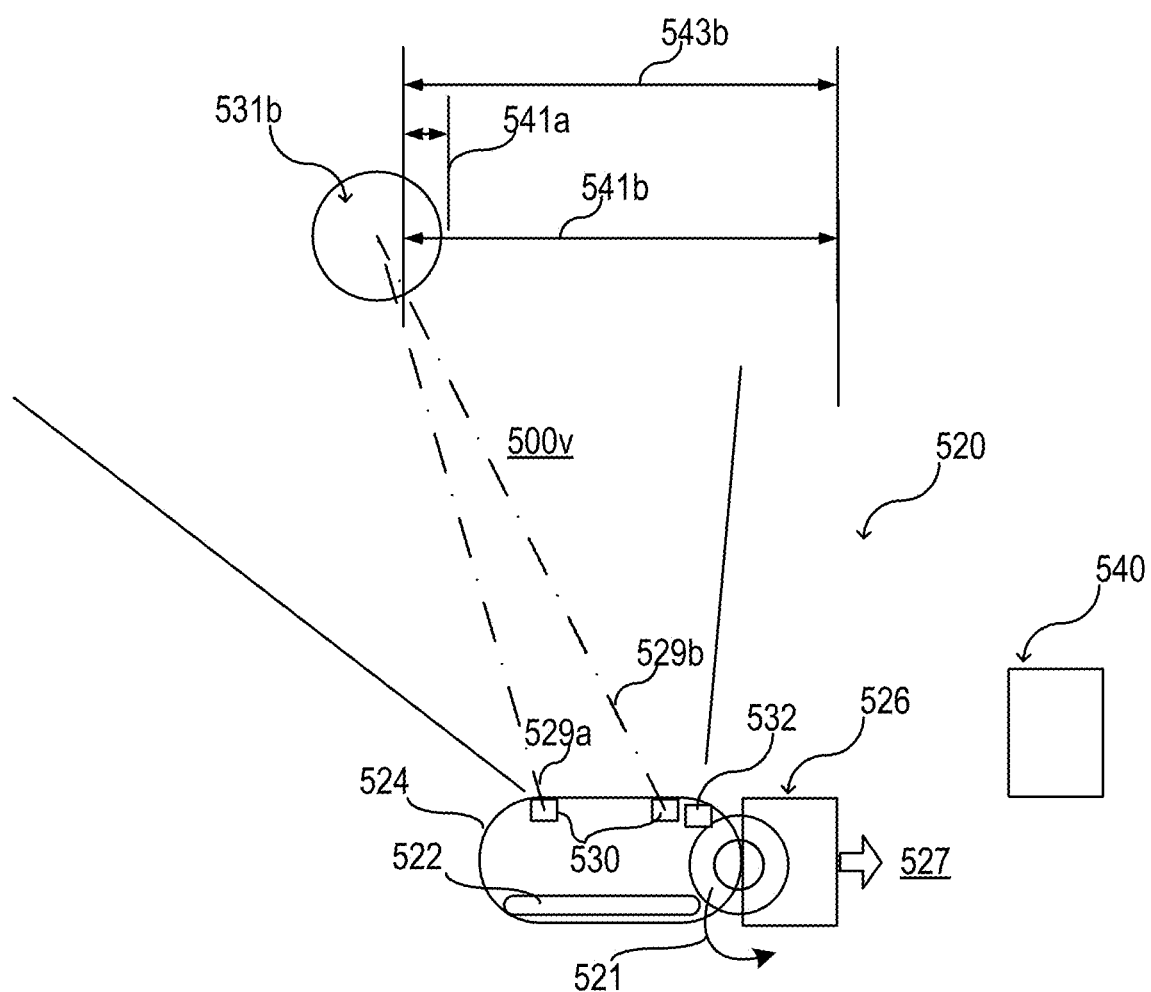

According to various aspects, the assembly 120 may be a side mirror assembly, wherein the moveable part 120m of the assembly 120 may include a housing and a mirror, see for example FIG. 5A and FIG. 5B. In this case, only the part 120 of the side mirror assembly may be moved from a first position 123a into a second position 123b, as illustrated in FIG. 1C. In a similar way, the whole assembly 120 may be moved from a first position 123a to a second position 123b. However, the assembly 120 protrudes from the external structure 102 with a first distance 101a in the case that the part 120m or the whole assembly 120 is in the first position 123a; and, the assembly 120 protrudes from the external structure 102 with a second distance 101b that is less than the first distance 101a in the case that the part 120m or the whole assembly 120 has been moved into the second position 123b.

As an example, the assembly 120 (e.g., a side mirror assembly) of the vehicle 100 may define an effective width 112e of the vehicle 100 considering the protrusion of the assembly 120 into a lateral direction (e.g., into a direction parallel to the lateral axis 111). Since at least a part 120m of the respective assembly 120 may be moveably mounted, see FIG. 1B, the effective width 112e may be greater in the case that the part 120m or the whole assembly 120 is in the first position 123a as in the case that the part 120m or the whole assembly 120 is in the second position 123b.

In the case the vehicle 100 has a first assembly 120 at the first side of the vehicle 100 and a second assembly 120 at the second side of the vehicle 100 opposite the first side (e.g., two side mirror assemblies disposed on opposite sides of the vehicle 100), the effective width 112e may be maximal in the case that both assemblies 120 are in the first position 123a, as illustrated in FIG. 1A. The effective width 112e may be reduced by moving the respective part 120m of at least one assembly 120 from its first position 123a into its second position 123b, as illustrated in FIG. 1B.

According to various aspects, the vehicle 100 may include one or more sensors 130 configured to receive obstacle information associated for example with a first location P1 of a first obstacle 131-1 and with a second location P2 of a second obstacle 131-2 in the vicinity of the vehicle 100. The respective location P1, P2 of the obstacles 131 may be determined relative to the location of the one or more sensors 130 and/or relative to the location of the respective assembly 120. As an example, the position of the one or more sensors 130 may be fixed with respect to the vehicle 100. Therefore, if the geometry of the vehicle 100 is known, e.g., if the location of the assembly 120 relative to the location of the one or more sensors 130 is known, the respective location P1, P2 of the obstacles 131 relative to the location of the assembly 120 may be determined (e.g., calculated) accordingly. In the case that the one or more sensors 130 are integrated into the assembly 120, e.g., into the housing of the side mirror assembly, the respective location P1, P2 of the obstacles 131 relative to the one or more sensors 130 may be substantially the same as relative to the assembly 120.

As illustrated in FIG. 1A, the obstacle information may allow to determine whether one or more obstacles 131 may approach the respective assembly 120 in such a way that a collision of the one or more obstacles 131 with the assembly 120 is likely. As an example, a collision threat may be predicted by one or more processors 140 if at least one obstacle 131 is located within a safety space 141 laterally next to the external structure 102 of the vehicle 100.

As an example, no collision threat may be predicted for the first obstacle 131-1 that is located laterally outside the safety space 141. In contrast, a collision threat may be predicted for the second obstacle 131-2 that is located within the safety space 141. According to various aspects, the safety space 141 laterally next to the external structure 102 of the vehicle 100 may be defined by the maximum effective width (see the effective width 112e in FIG. 1A) of the vehicle 100, and, optionally, by considering additionally a lateral safety tolerance 112t.

According to various aspects, the one or more processors 140 may be configured to trigger the movement 121 of at least the part 120m of the assembly 120 from the first position 123a into the second position 123b in the case that the collision threat is predicted. As illustrated, for example, in FIG. 1B, the effective width 112e of the vehicle 100 may be reduced in this case. As a result, a collision of the assembly 120 with the obstacle 131-2 that is located within the (e.g., lateral) safety space 141 of the vehicle 100 can be avoided.

As illustrated, for example, in FIG. 1B, a proximity (illustratively a lateral proximity) of the assembly 120 to the one or more obstacles 131 may be predicted. The collision threat may be predicted where the predicted proximity is less than or equal to a predetermined threshold. As an example, a lateral safety distance 143 may be associated with the vehicle 100, e.g., with the external structure 102 and/or with the assembly 120 of the vehicle 100. As an example, the lateral safety distance 143 with respect to the external structure 102 may be equal to or greater than the first distance 101a. According to various aspects, the lateral safety distance 143 with respect to the external structure 102 may be equal to or greater than a sum of the first distance 101a and a lateral safety tolerance 112t. The lateral safety tolerance 112t may be, for example, in the range from about one centimeter to about twenty centimeters.

According to various aspects, a collision threat may be predicted in the case that a lateral distance 143a, 143b of the one or more obstacles 131 from the external structure 102 and, therefore, from the assembly 120 is less than or equal to the lateral safety distance 143.

According to various aspects, the one or more processors 140 may be further configured to determine (e.g., from the obstacle information) a longitudinal distance (e.g., parallel to the longitudinal axis 113 of the vehicle 100) of the one or more obstacles 131 from the external structure 102 and/or from the assembly 120, and to trigger the movement 121 of at least the part 120m of the assembly 120 from the first position 123a into the second position 123b only in the case that the determined longitudinal distance is less than or equal to a (e.g. predetermined) longitudinal safety distance 151. As an example, a collision threat may be only predicted in the case that an obstacle 131 is located within the lateral safety space 141, wherein the lateral safety space is defined by a lateral safety distance 143 and a longitudinal safety distance 151. The longitudinal safety distance 151 may be selected such that there is sufficient time for the movement 121 of at least the part 120m of the assembly 120 before the obstacle would collide with the assembly 120 or with at least the part 120m of the assembly 120.

According to various aspects, the one or more sensors 130 may include, for example, one or more cameras (e.g., one or more depth cameras, one or more stereo cameras, etc.), one or more ultrasonic sensors, one or more radar (radio detection and ranging) sensors, one or more lidar (light detection and ranging) sensors, etc. The one or more sensors 130 may include, for example, any other suitable sensor that allows a detection of an object and the corresponding position of the object.

Figure 2:
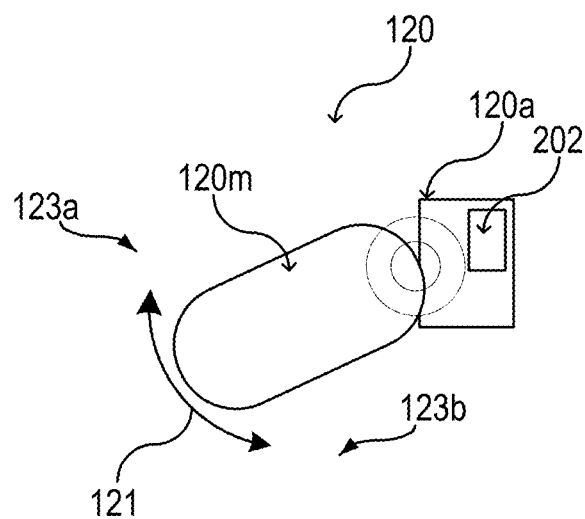
FIG. 2 shows an exemplary assembly of a vehicle in a more detailed view, according to some aspects.

FIG. 2 illustrates an assembly 120, e.g., a side mirror assembly, a coupling assembly, a door assembly, a trunk lid assembly, an antenna assembly, etc., of a vehicle 100, according to some aspects. An electric motor 202 may be coupled to the assembly 120 or may be integrated into the assembly 120. The electric motor 202 may be configured to drive the movement 121 of at least the part 120m of the assembly 120 from the first position 123a into the second position 123b and, e.g., optionally, from the second position 123b back into the first position 123a. The one or more processors 140 of the vehicle 100 may be configured to trigger the movement 121 of at least the part 120m of the assembly 120 by instructing a control of the electric motor 202 or by controlling the electric motor 202.

According to various aspects, in response to the triggering of the movement 121, the electric motor 202 may be configured to move at least the part 120m of the assembly 120 from the first position 123a into the second position 123b within a time period of less than 1 s, e.g., within less than 0.5 s.

As an example, the part 120m of the assembly 120 may be a door of the vehicle 100 that is movably mounted to the external structure 102. In another example, the the part 120m of the assembly 120 may be a trunk lid of the vehicle 100 that is movably mounted to the external structure 102. As a further example, the part 120m of the assembly 120 may be a side mirror of the vehicle 100 that is movably mounted to the external structure 102. Further, the part 120m of the assembly 120 may be any other part of the vehicle 100 that is movably mounted to the external structure 102, e.g. a coupling, an antenna, etc. The movement 121 of at least the part 120m of the assembly 120 may be a linear movement, a rotational movement, and/or a pivotal movement.

Figure 3A:
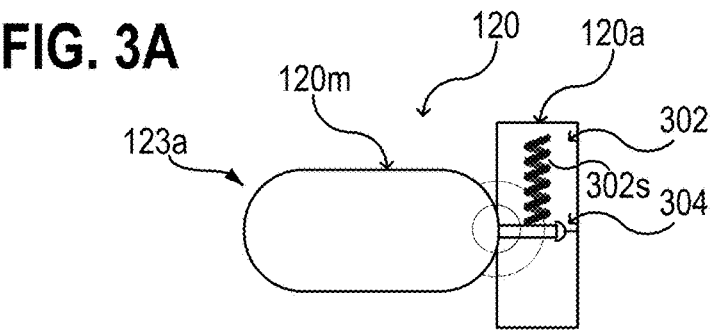
FIG. 3A to FIG. 3C show an exemplary assembly of a vehicle including a spring mechanism to move a part of the assembly, according to some aspects.
Figure 3B:
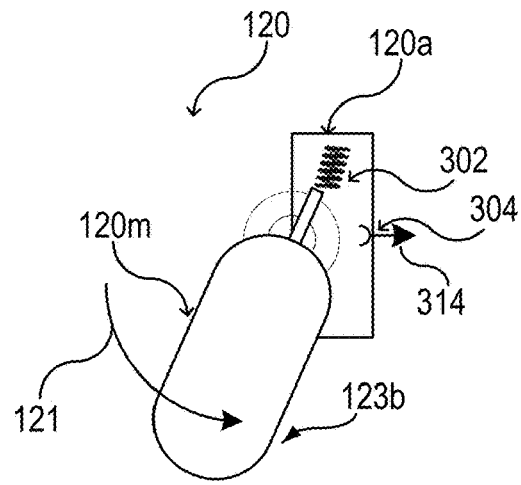

FIG. 3A and FIG. 3B illustrate a spring mechanism 302, according to various aspects. The spring mechanism 302 may include at least one spring 302s coupled to the assembly 120, e.g., coupled to the movably mounted part 120m of the assembly 120. The spring mechanism 302 may be configured to move at least the part 120m of the assembly 120 from the first position 123a to the second position 123b.

According to various aspects, the spring mechanism 302 may include one or more springs 302s to generate a spring force to move at least the part 120m of the assembly 120 from the first position 123a to the second position 123b. The spring mechanism 302 may include a releasable latch 304 (or any other suitable release structure) configured to hold at least the part 120m of the assembly 120 in the first position 123a against the spring force until released. The one or more processors 140 of the vehicle 100 may be configured to trigger the movement 121 of at least the part 120m of the assembly 120 by triggering a release 314 of the releasable latch 304.

Figure 3C:
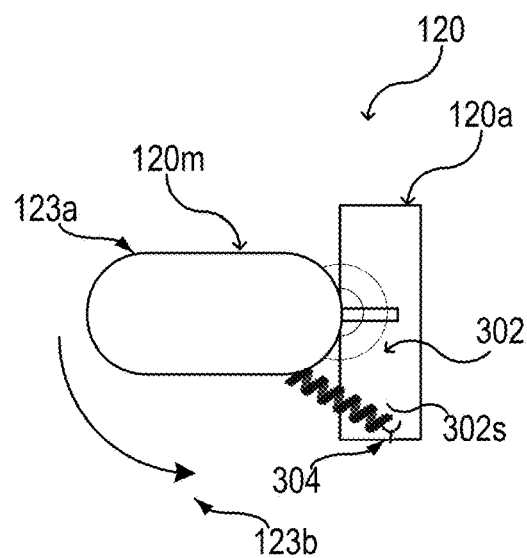

Other techniques and implementations may be used in a similar way to achieve that function. As an example, the spring 302s may be attached directly to the side mirror (or in general to the assembly 120 or to a part 120m of the assembly 120), as illustrated in FIG. 3C in a schematic view. In this case, the spring 302s may pull the side mirror (or in general the assembly 120 or a part 120m of the assembly 120) towards the second position 123b. If a collision threat is predicted, the releasable latch may be used to release the spring 302s and the force of the spring 302s may pull the side mirror into the second position 123b.

Figure 4A:
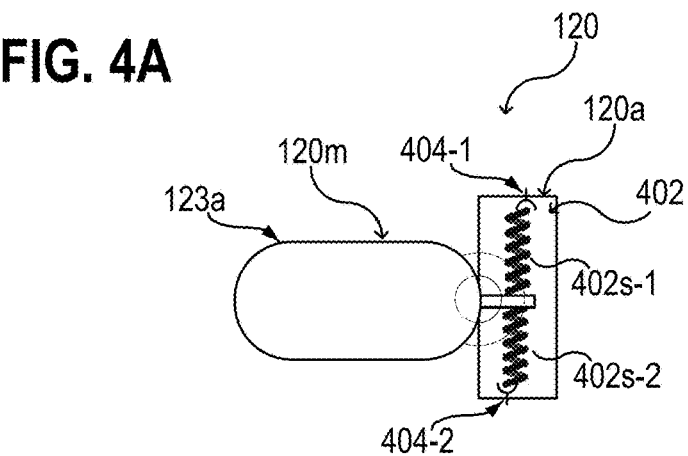
FIG. 4A to FIG. 4D show an exemplary assembly of a vehicle including a spring mechanism to move a part of the assembly, according to some aspects.
Figure 4B:
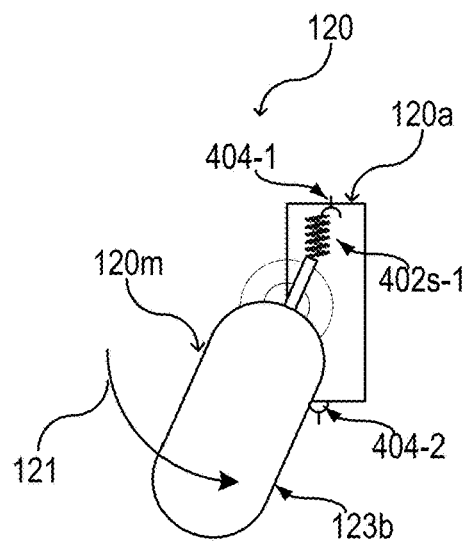
Figure 4C:
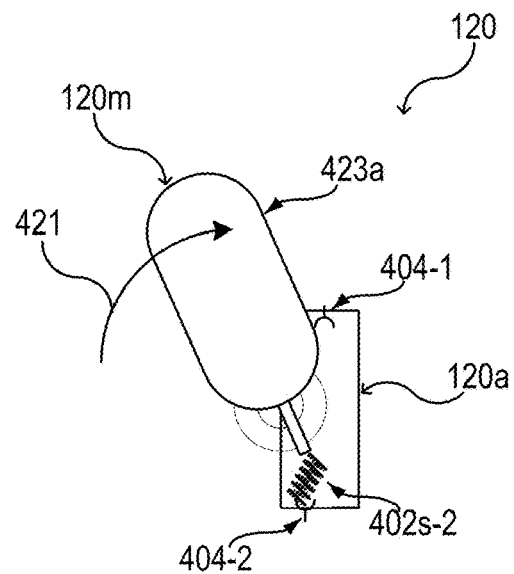

FIG. 4A, FIG. 4B, and FIG. 4C illustrate another spring mechanism 402, according to various aspects. The spring mechanism 402 may include at least one first spring 402s-1 to generate a first spring force to move 121 at least the part 120m of the assembly 120 from the first position 123a to the second position 123b. The spring mechanism 402 may further include at least one second spring 402s-2 to generate a second spring force to move 421 at least the part 120m of the assembly 120 from the first position 123a to a third position 423a.

The spring mechanism 402 may include a release structure configured to selectively release the at least one first spring 402s-1 or the at least one second spring 402s-2. The one or more processors 140 of the vehicle 100 may be configured to trigger the movement 121, 421 of at least the part 120m of the assembly 120 by triggering a release of the release structure. According to various aspects, release structure may include a first releasable latch 404-1 to release the at least one first spring 402s-1 and a second releasable latch 404-2 to release the at least one second spring 402s-2.

As illustrated in FIG. 4B, the spring mechanism 402 may be configured to move 121 at least the part 120m of the assembly 120 from the first position 123a to the second position 123b via the at least one first spring 402s-1 in response to a release of the at least one second spring 402s-2 via the second releasable latch 404-2. Further, as illustrated in FIG. 4C, the spring mechanism 402 may be configured to move 421 at least the part 120m of the assembly 120 from the first position 123a to the third position 423a via the at least one second spring 402s-2 in response to a release of the at least one first spring 402s-1 via the first releasable latch 404-1. The spring mechanism 402 may be configured to hold at least the part 120m of the assembly 120 in the first position 123a until either the at least one first spring 402s-1 or the at least one second spring 402s-2 is released.

According to various aspects, the respective spring mechanism 302, 402 may push a side mirror of a vehicle 100 into its parking position or into another safety position in which the side mirror protrudes from the external structure 102 with a possibly small distance. In this case, the spring mechanism 302, 402 may at least assist movement of the side mirror, e.g., in the cast that an electric motor that may be used for rotating the side mirror (e.g., when the car is locked) is too slow to react in a collision situation. Illustratively, the spring mechanism 302, 402 may allow to quickly (e.g., in less than 1 s) retract the side mirror of a vehicle 100 to prevent a collision.

Figure 4D:
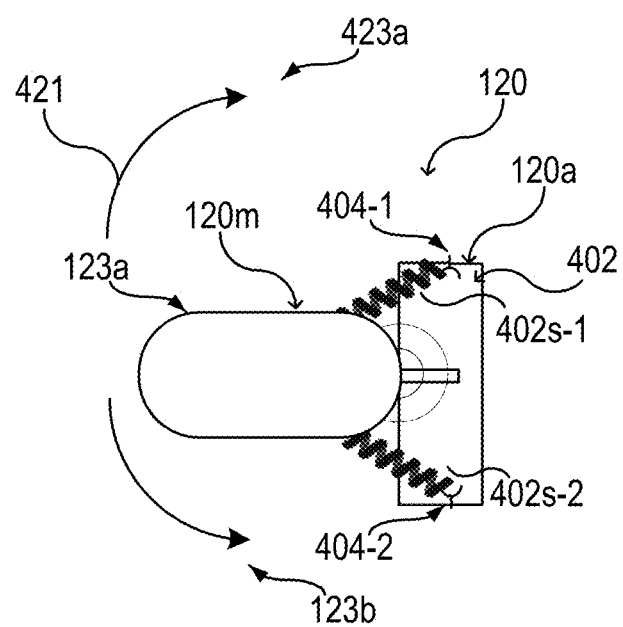

As shown in FIG. 4A to FIG. 4C, the first spring 402s-1 may pull the side mirror (or in general the assembly 120 or a part 120m of the assembly 120) towards the second position 123b, while the second spring 402s-2 may pull the side mirror towards the third position 423a. They even themselves out and the mirror may stay in the first position 123a. If a collision threat is predicted, a holding contact (e.g., the release structure 404-1, 404-2) on the first spring 402s-1 or the second spring 402s-2 may be released. The force of the first spring 402s-1 may pull the side mirror immediately into the second position 123b or the force of the second spring 402s-2 may pull the side mirror immediately into the third position 423a. Other techniques and implementations may be used in a similar way to achieve that. As an example, the springs 402s-1, 402s-2 may be attached directly to the side mirror, as illustrated in FIG. 4D. In this case, the first spring 402s-1 may pull the side mirror (or in general the assembly 120 or a part 120m of the assembly 120) towards the third position 423a, while the second spring 402s-2 may pull the side mirror towards the second position 123b. The two springs compensate each other and the mirror may stay in the first position 123a. If a collision threat is predicted, a holding contact (e.g., the release structure 404-1, 404-2) on the first spring 402s-1 or the second spring 402s-2 may be released. The force of the first spring 402s-1 may pull the side mirror immediately into the third position 423a or the force of the second spring 402s-2 may pull the side mirror immediately into the second position 123b.

Illustratively, a system is provided that can detect if a car with extended mirrors is too wide and where putting them into a closed position aligned with the car can avoid crashes and having mirrors ripped off.

FIG. 5A and FIG. 5B shows a side mirror assembly 520 in a schematic view, according to various aspects. The side mirror assembly 520 may be used as an assembly for a vehicle, e.g., as described herein with reference to the vehicle 100 and the one or more assemblies 120.

According to various aspects, the side mirror assembly 520 may include a side mirror 522. The side mirror 522 may be disposed within a side mirror housing 524. The side mirror assembly 520 may further include an attachment structure 526 to attach 527 the side mirror assembly 520 to an external structure 502 of a vehicle. Further, the attachment structure 526 may be configured to allow a movement 521 of the side mirror 522 and the side mirror housing 524 relative to the attachment structure 526 and relative to the external structure 502 at which the side mirror assembly 520 may be attached 527.

Further, the side mirror assembly 520 may include one or more range imaging sensors 530. The one or more range imaging sensors 530 may be configured to receive obstacle information associated with a location of one or more obstacles 531a, 531b relative to the side mirror assembly 520.

According to various aspects, the one or more range imaging sensors 530 may include at least two cameras configured to generate at least two photographic images taken from different vantage points 529a, 529b. According to various aspects, the side mirror assembly 520 may include an infrared illumination device 532 configured to at least partially illuminate a field of vision 500v of the one or more range imaging sensors 530. However, the infrared illumination device 532 may be integrated at other positions of the vehicle 100 in some aspects. A line of vision 533 of the one or more range imaging sensors 520 may be aligned in a forward driving direction or, alternatively or additionally, in a rear driving direction of the vehicle at which the side mirror assembly 520 may be attached.

According to various aspects, the one or more range imaging sensors 530 of the side mirror assembly 520 may be communicatively coupled to one or more processors 540. The one or more processors 540 may be integrated into the side mirror assembly 520. Alternatively, the one or more processors 540 may be part of the vehicle at which the side mirror assembly 520 may be attached 527. As an example, the one or more processors 540 may be integrated into a head unit of the vehicle 100.

According to various aspects, the one or more processors 540 may be configured to determine a lateral distance 543a of the one or more obstacles 531a, 531b from the side mirror assembly 520. Further, where the determined lateral distance 543a from the side mirror assembly 520 is less than or equal to a corresponding (e.g., predetermined) lateral safety distance 541a, a collision threat is predicted. In a similar way, the one or more processors 540 may be configured to determine a lateral distance 543b of the one or more obstacles 531a, 531b from any external structure 502 at which the side mirror assembly 520 is attached 527. Further, where the determined lateral distance 543b from the external structure 502 is less than or equal to a corresponding (e.g., predetermined) lateral safety distance 541b, a collision threat is predicted. In response to a predicted collision threat, the side mirror 522 and the side mirror housing 524 may be moved 521 relative to the attachment structure 526 and relative to the external structure 502 at which the side mirror assembly 520 may be attached 527 to avoid a collision of the side mirror assembly 520 with the one or more obstacles 531a, 531b.

Illustratively, FIG. 5A shows a first obstacle 531a that is not within the lateral safety distance 541a, 541b and, therefore, no collision threat would be predicted in this case; and, FIG. 5B shows a second obstacle 531b that is within the lateral safety distance 541a, 541b and, therefore, a collision threat would be predicted in this case.

According to various aspects, an additional collision avoidance system may be implemented into vehicle 100 to prevent a direct collision of an obstacle with the external structure 102 of the vehicle 100.

Figure 6:
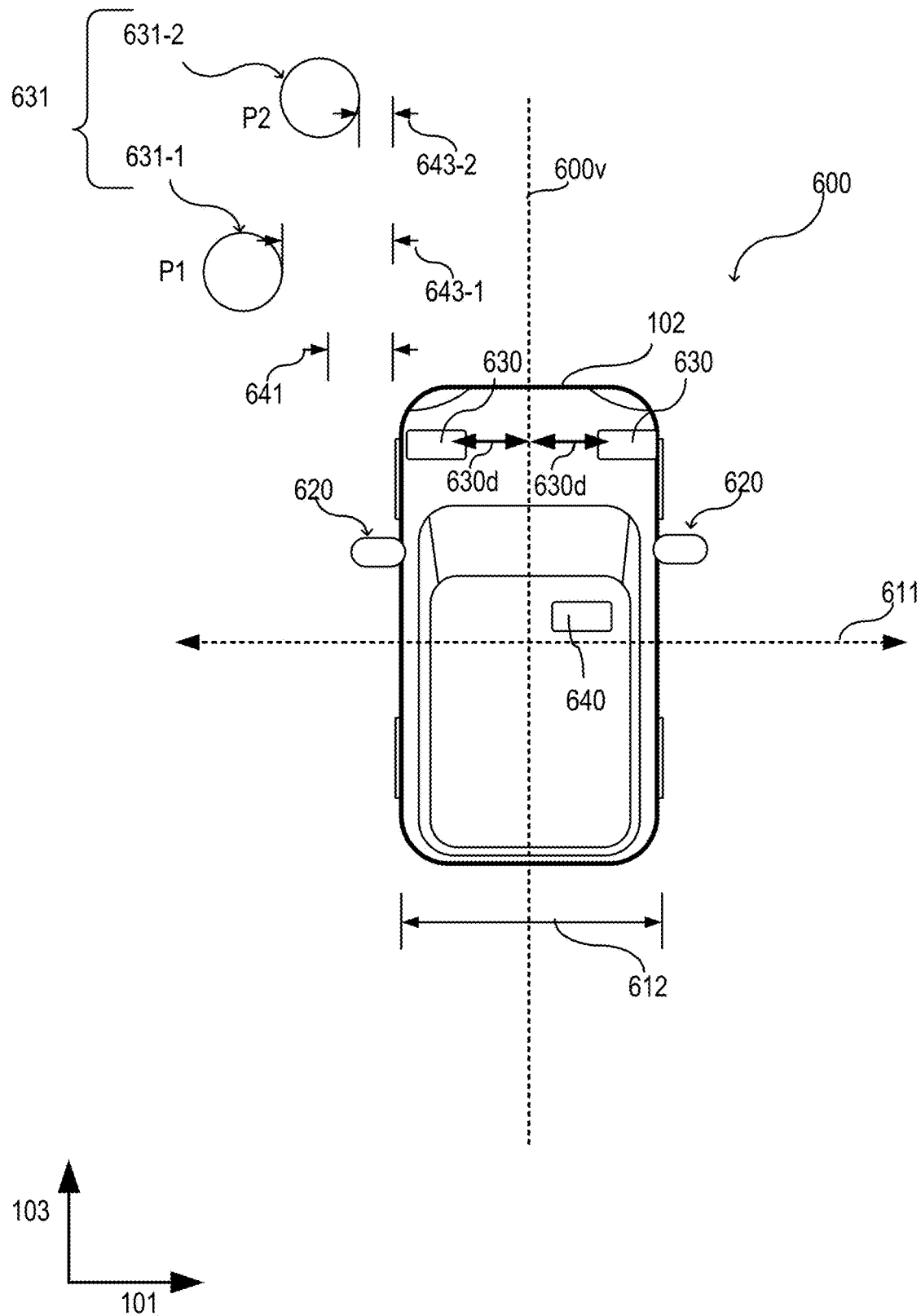
FIG. 6 shows an exemplary vehicle including a collision threat prediction based on one or more range imaging sensors, according to some aspects.

FIG. 6 shows a vehicle 600 in a schematic view, according to various aspects. In one or more aspects, the vehicle 600 may be configured as the vehicle described above, e.g., as described with respect to FIG. 1A to FIG. 1C. In one or more aspects, the vehicle 600 may include one or more assemblies 620. Each of the one or more assemblies 620 may be configured as described above with respect to the assembly 120 and/or the side mirror assembly 520, e.g., as described with respect to FIG. 2, FIG. 3A to FIG. 3C, FIG. 4A to FIG. 4D, FIG. 5A, and FIG. 5B.

According to various aspects, the vehicle 600 may include one or more range imaging sensors 630 disposed in a position distanced 630*d* from a central vertical longitudinal plane 600*v* of the vehicle 600 and configured to receive obstacle information associated with a lateral distance 643-1, 643-2 of one or more obstacles 631 from the vehicle 600.

As an example, the vehicle 600 may include an external structure 102, as described herein, and the lateral distance 643-1, 643-2 is determined relative to the external structure 102.

Illustratively, the vehicle 600 may define a (e.g., central) longitudinal axis. The longitudinal axis may be associated with a forward driving direction (e.g., illustratively in direction 103 as illustrated in FIG. 6) and/or a rear driving direction (e.g., illustratively opposite to the direction 103). Further, the vehicle 600 may define a lateral axis 611 perpendicular to the longitudinal axis. A width (e.g., a maximum width 612) of the vehicle 600 may be determined parallel to the lateral axis 611 (e.g., illustratively parallel to direction 101 and perpendicular to direction 103).

The lateral axis 611 may be perpendicular to the central vertical longitudinal plane 600*v*. In other words, the central longitudinal axis may partially define (e.g., lie in) the central vertical longitudinal plane 600*v*.

The lateral distance 643-1, 643-2 may be determined (e.g., measured, calculated, etc.) parallel to the lateral axis 611 (e.g., illustratively parallel to direction 101 and perpendicular to direction 103). In other words, the lateral distance 643-1, 643-2 may be determined (e.g., measured, calculated, etc.) along a direction perpendicular to the central vertical longitudinal plane 600*v*. The central vertical longitudinal plane 600*v* may be a symmetry plane of the vehicle 600, e.g., a body and/or a chassis of the vehicle 600 may be configured substantially symmetric (e.g., in in mirror symmetry) with respect to the central vertical longitudinal plane 600*v*.

According to various aspects, one or more processors 640 may be configured to compare the lateral distance of the one or more obstacles 631 from the vehicle 600 with a lateral safety distance, and, to trigger a safety operation based on the comparison. As an example, the safety operation may be triggered only in the case that the lateral distance 643-1, 643-2 of at least one obstacle 631-1, 631-2 of the one or more obstacles 631 is equal to or less than the lateral safety distance 641.

According to various aspects, the distance 630*d* of the one or more range imaging sensors 630 from the central vertical longitudinal plane 600*v* of the vehicle 600 may be greater than a quarter of the (e.g., maximum) width 612 of the vehicle 600.

Positioning of the one or more range imaging sensors 630 distanced from the central vertical longitudinal plane 600*v* allows for example obtaining range imaging data via the one or more range imaging sensors from a perspective that provides an efficient determination of a lateral distance of one or more obstacles 631 from the vehicle 600. The one or more range imaging sensors 630 may include one or more cameras (e.g., one or more depth cameras, one or more stereo cameras, etc.).

Figure 7:
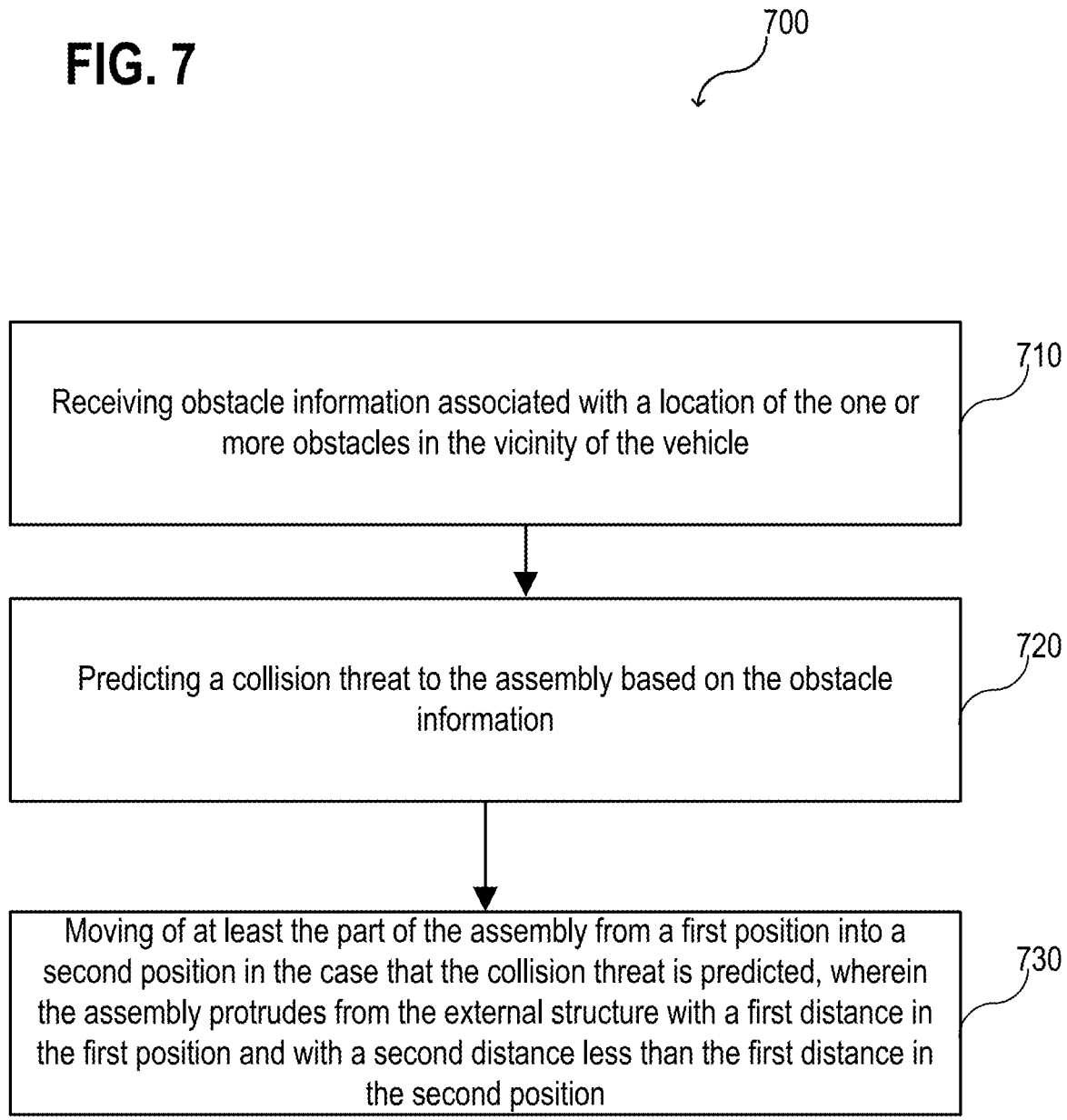
FIG. 7 shows an exemplary flow diagram of a method for avoiding collision of one or more obstacles with an assembly attached to an external structure of a vehicle, according to some aspects.

FIG. 7 illustrates a schematic flow diagram of a method 700 for avoiding collision of one or more obstacles with an assembly attached to an external structure of a vehicle, according to various aspects. The method 700 may include: in 710, receiving obstacle information associated with a location of the one or more obstacles in a vicinity of the vehicle; in 720, predicting a collision threat to the assembly based on the obstacle information, and, in 730, moving of at least the part of the assembly from a first position into a second position in the case that the collision threat is predicted, wherein the assembly protrudes from the external structure with a first distance in the first position and with a second distance less than the first distance in the second position.

According to some aspects, the method 700 may include similar or the same functions as described herein with respect to the vehicle 100, 600 and/or the side mirror assembly 520.

Figure 8:
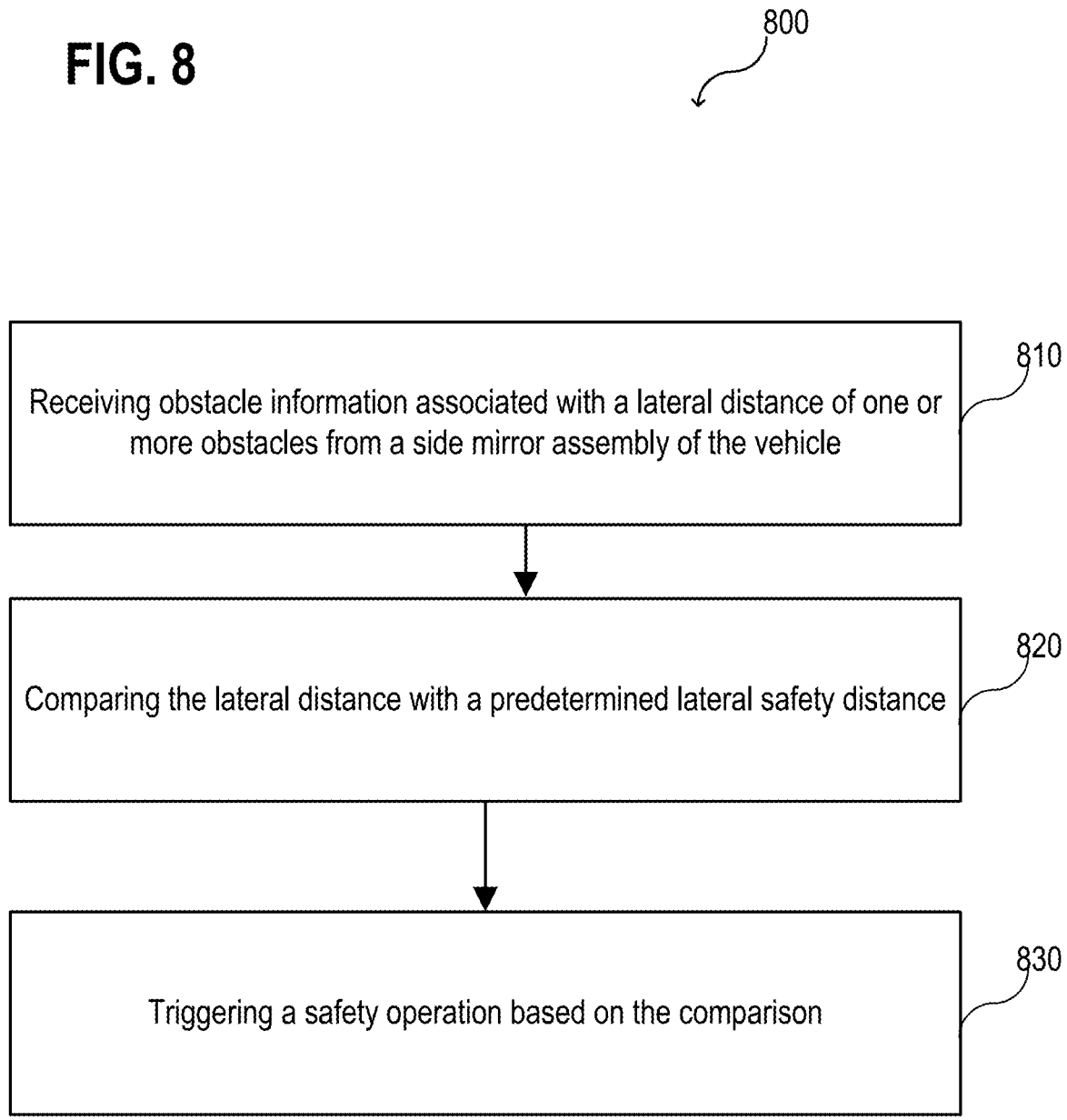
FIG. 8 shows an exemplary flow diagram of a method for operating a vehicle, according to some aspects.

FIG. 8 illustrates a schematic flow diagram of a method 800 for operating a vehicle, according to various aspects. The method 800 may include: in 810, receiving obstacle information associated with a lateral distance of one or more obstacles from a side mirror assembly of the vehicle; in 820, comparing the lateral distance with a lateral safety distance, and, in 830, triggering a safety operation based on the comparison.

According to some aspects, the method 800 may include similar or the same functions as described herein with respect to the vehicle 100, 600 and/or the side mirror assembly 520.

Figure 9:
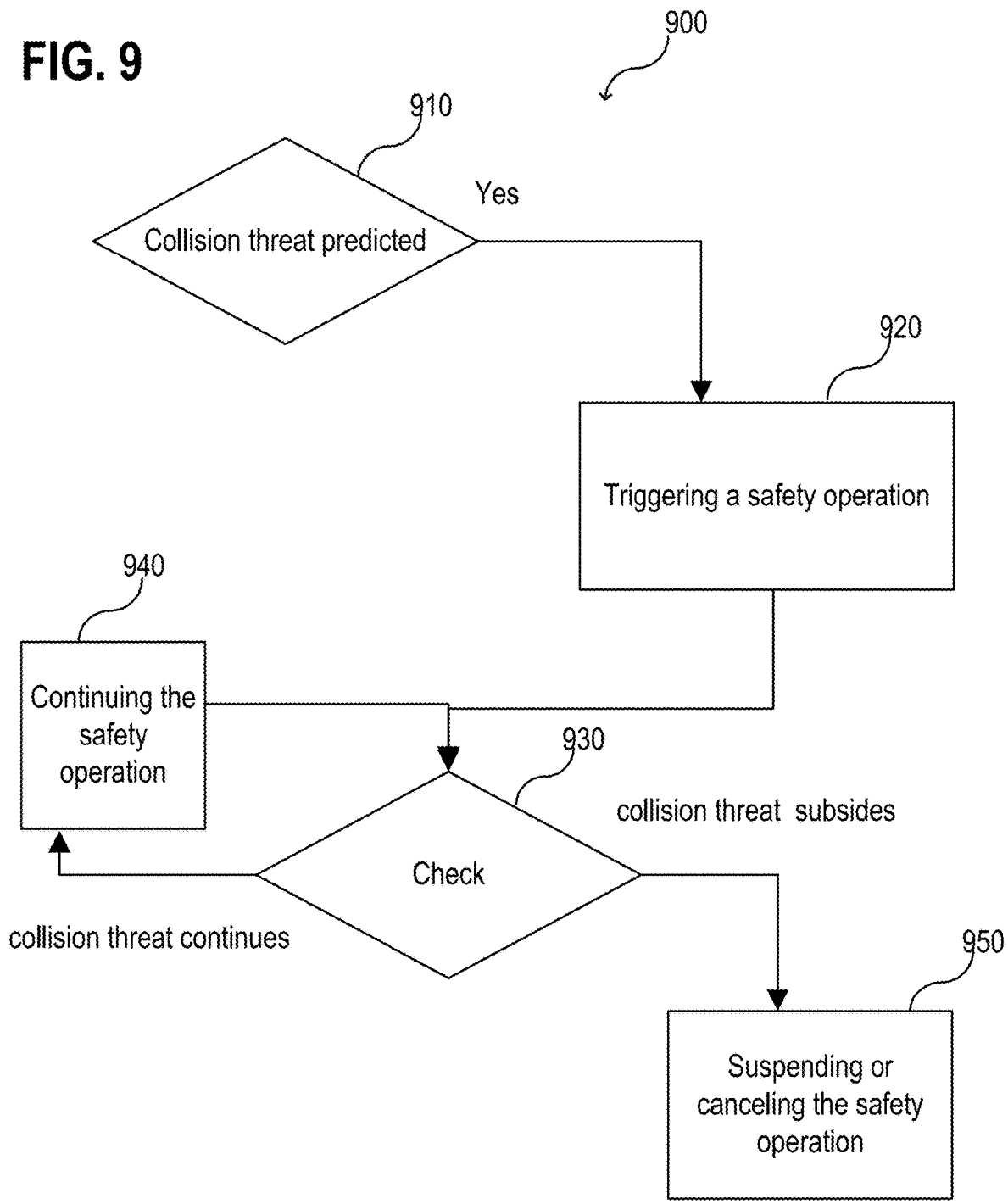
FIG. 9 shows an exemplary flow diagram of a process associated with operating a vehicle or collision avoidance, according to some aspects.

FIG. 9 illustrates a schematic flow diagram of a process 900, according to various aspects. The process 900 may include, in 910, checking whether a collision threat is predicted or not. In the case that a collision threat is predicted, in 920, triggering a safety operation. The process 900 may further include, in 930, checking whether the collision threat continues or subsides. In the case that the collision threat continues, in 940, continuing the safety operation; and, after a predefined time interval, repeat process stage 930, i.e. checking whether the collision threat continues or subsides. In the case that the collision threat subsides, in 950, suspending or canceling the safety operation.

According to various aspects, the safety operation may include a movement of a side mirror of a side mirror assembly from a first position into a second position, e.g., as described herein. According to various aspects, the collision threat may be predicted based on obstacle information associated with a lateral distance of one or more obstacles from the side mirror assembly and comparing the lateral distance with a (e.g., predetermined) lateral safety distance.

According to various aspects, a safety operation may be carried out in response to a predicted collision of an obstacle with an assembly 120, 520 of the vehicle 100, 600. The safety operation may include a movement of the respective assembly for which a collision is predicted. However, alternatively or additionally, the safety operation may include stopping the vehicle, instructing or generating an alarm (e.g. a visual alarm, an acoustic alarm, etc.), etc.

Figure 10:
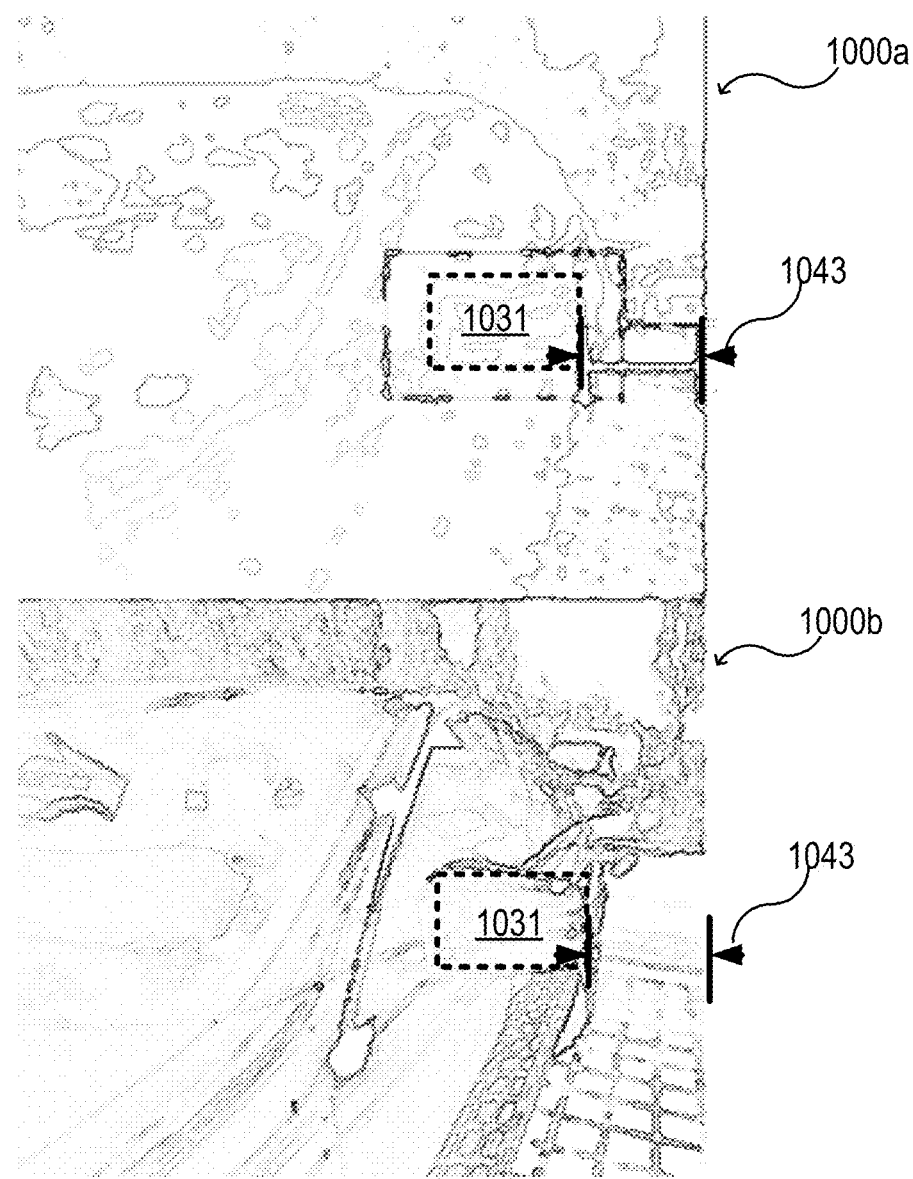
FIG. 10 shows an image and a corresponding range image for detecting an obstacle in a vicinity of a vehicle, according to some aspects.

FIG. 10 illustrates a range image 1000*a* obtained from a range imaging camera (also referred to as depth camera or stereo camera) and a photographic image 1000*b* of the same scene, according to various aspects. The range image 1000*a* may include range data or may have range data associated therewith that allows to identify an obstacle 1031 that is close (or e.g., closest) to a side mirror (or any other attachment part) of a vehicle from which the range image 1000*a* is taken. Illustratively, the range image 1000*a* is obtained from the perspective of the vehicle, e.g., from a range imaging camera mounted at the side mirror or near the side mirror. Further, the range image 1000*a* may include range data or may have range data associated therewith that allows determining a lateral distance 1043 of the obstacle 1031 from the side mirror. This allows to predict a likelihood of a collision of the obstacles 1031 with the side mirror based on the determined lateral distance 1043. As an example, a collision may be likely if the determined lateral distance 1043 is equal to or less than a lateral safety distance, e.g., equal to or less than 20 cm, e.g., equal to or less than 10 cm, or equal to or less than 5 cm.

According to various aspects, an obstacle may include any solid object that could harm the assembly 120 in the case of a collision. The obstacle may be, for example, a side mirror of another vehicle.

In the following, various examples are provided with reference to the aspects described above.

Example 1 is a vehicle 100 including: an external structure 102; an assembly 120 including an attachment structure 120*a* to attach the assembly 120 to the external structure 102, wherein the attachment structure 120*a* is configured to allow a movement 121, 421, 521 of at least a part 120*m* of the assembly 120 relative to the external structure 102 at least from a first position 123*a* to a second position 123*b*, wherein the assembly 120 protrudes from the external structure 102 with a first distance 101*a* in the first position 123*a* and with a second distance 101*b* less than the first distance 101*a* in the second position 123*b*; one or more sensors 130 configured to receive obstacle information associated with a location P1, P2 of one or more obstacles 131, 531*a*, 531*b* in a vicinity of the vehicle 100; one or more processors 140, 540 configured to predict a collision threat to the assembly 120 based on the obstacle information, and trigger the movement 121, 421, 521 of at least the part 120*m* of the assembly 120 from the first position 123*a* into the second position 123*b* in the case that the collision threat is predicted. According to various aspects, a vehicle 100 may include: an external structure 102; an assembly 120 attached to the external structure 102, wherein the assembly 120 is configured to allow a movement 121, 421, 521 of at least a part 120*m* of the assembly 120 relative to the external structure 102 at least from a first position 123*a* to a second position 123*b*, wherein the assembly 120 protrudes from the external structure 102 with a first distance 101*a* in the first position 123*a* and with a second distance 101*b* less than the first distance 101*a* in the second position 123*b*; one or more sensors 130 configured to receive obstacle information associated with one or more obstacles 131, 531*a*, 531*b* in the vicinity of the vehicle 100; one or more processors 140, 540 configured to predict a collision threat to the assembly 120 based on the obstacle information, and trigger the movement 121, 421, 521 of at least the part 120*m* of the assembly 120 from the first position 123*a* into the second position 123*b* in the case that the collision threat is predicted.

In some aspects, the obstacle information may be associated with at least one of the following: a location P1, P2 of the respective obstacle of the one or more obstacles, a direction of travel of the respective obstacle of the one or more obstacles, a velocity of the respective obstacle of the one or more obstacles, and/or a dimension of the respective obstacle of the one or more obstacles.

In some aspects, a movement of at least the part 120*m* of the assembly 120 from the second position 123*b* into the first position 123*a* may be canceled or suspended in the case that a collision threat is predicted. In some aspects, a vehicle 100 may include: an external structure 102; an assembly 120 including an attachment structure 120*a* to attach the assembly 120 to the external structure 102, wherein the attachment structure 120*a* is configured to allow a movement 121, 421, 521 of at least a part 120*m* of the assembly 120 relative to the external structure 102 at least from a second position 123*b* to a first position 123*a*, wherein the assembly 120 protrudes from the external structure 102 with a first distance 101*a* in the first position 123*a* and with a second distance 101*b* less than the first distance 101*a* in the second position 123*b*; one or more sensors 130 configured to receive obstacle information associated with a location P1, P2 of one or more obstacles 131, 531*a*, 531*b* in a vicinity of the vehicle 100; one or more processors 140, 540 configured to predict a collision threat to the assembly 120 based on the obstacle information, and prevent the movement 121, 421, 521 of at least the part 120*m* of the assembly 120 into the first position 123*a* in the case that the collision threat is predicted.

In example 2, the vehicle 100 of example 1 may further include that the external structure 102 includes at least one of the following structures: a chassis and/or a vehicle body.

In example 3, the vehicle 100 of example 1 or 2 may further include that the assembly 120 includes at least one of the following assemblies: a side mirror assembly 520; a coupling assembly; a door assembly; a trunk lid assembly; and/or an antenna assembly.

In example 4, the vehicle 100 of any one of examples 1 to 3 may further include that predict a collision threat includes: predicting a proximity of the assembly 120 to the one or more obstacles 131, 531*a*, 531*b*. The collision threat may be predicted in the case that the predicted proximity is less than or equal to a (e.g., predetermined) threshold.

In example 5, the vehicle 100 of any one of examples 1 to 4 may further include that predict a collision threat includes: determining a lateral distance of the one or more obstacles 131, 531*a*, 531*b* from the external structure 102, and in the case that the determined lateral distance is less than or equal to a (e.g., predetermined) lateral safety distance the collision threat is predicted.

In example 6, the vehicle 100 of example 5 may further include that the lateral distance is determined along a direction perpendicular to a longitudinal axis 113 or a central vertical longitudinal plane 600*v* of the vehicle 100.

In example 7, the vehicle 100 of example 5 or 6 may further include that the lateral safety distance is equal to or greater than the first distance 101*a*.

In example 8, the vehicle 100 of example 5 or 6 may further include that the lateral safety distance is equal to or greater than a sum of the first distance 101*a* and a lateral safety tolerance 112*t*.

In example 9, the vehicle 100 of example 8 may further include that the lateral safety tolerance 112*t* is in the range from about one centimeter to about twenty centimeters.

In example 10, the vehicle 100 of any one of examples 1 to 9 may further include that the one or more sensors 130 include one or more range imaging sensors 530.

In example 11, the vehicle 100 of example 10 may further include: an infrared illumination device 532 configured to at least partially illuminate a field of vision 500*v* of the one or more range imaging sensors 530.

In example 12, the vehicle 100 of example 10 or 11 may further include that the one or more range imaging sensors 530 includes at least two cameras configured to generate at least two photographic images taken from different vantage points 529*a*, 529*b*.

In example 13, the vehicle 100 of any one of examples 10 to 12 may further include that a line of vision 533 of the one or more range imaging sensors 520 is aligned in a forward driving direction or a rear driving direction.

In example 14, the vehicle 100 of any one of examples 1 to 13 may further include that, after the collision threat is predicted, the one or more processors 140, 540 are further configured to determine whether the collision threat continues or subsides. The one or more processors 140, 540 are further configured to trigger an additional movement of at least the part 120m of the assembly 120 from the second position 123b into the first position 123a in response to the collision threat subsiding.

In example 15, the vehicle 100 of any one of examples 1 to 14 may further include that the one or more processors 140, 540 are further configured to trigger the movement 121, 421, 521 of at least the part 120m of the assembly 120 from the first position 123a into the second position 123b only in the case that the collision threat continues for a time period greater than or equal to a predetermined time period.

In example 16, the vehicle 100 of example 15 may further include that the predetermined time period is in the range from about 30 milliseconds to about 1000 milliseconds. The predetermined time period may be greater than about 30 milliseconds.

In example 17, the vehicle 100 of any one of examples 1 to 16 may further include that the one or more processors 140, 540 are further configured to determine a longitudinal distance of the one or more obstacles 131, 531a, 531b from the assembly 120, and to trigger the movement 121, 421, 521 of at least the part 120m of the assembly 120 from the first position 123a into the second position 123b only in the case that the determined longitudinal distance is less than or equal to a longitudinal safety distance 151.

In example 18, the vehicle 100 of example 17 may further include that the longitudinal distance is determined in a direction parallel to a longitudinal axis 113 of the vehicle 100.

In example 19, the vehicle 100 of example 17 or 18 may further include that the longitudinal safety distance 151 is in the range from about 1 meter to about 100 meters.

In example 20, the vehicle 100 of any one of examples 1 to 19 may further include: a spring mechanism 302, 402 configured to move at least the part 120m of the assembly 120 from the first position 123a to the second position 123b.

In example 21, the vehicle 100 of example 20 may further include that the spring mechanism 302 includes one or more springs 302s to generate a spring force to move at least the part 120m of the assembly 120 from the first position 123a to the second position 123b. The spring mechanism may further include a releasable latch 304 configured to hold at least the part 120m of the assembly 120 in the first position 123a against the spring force until released. Further, the one or more processors 140, 540 may be configured to trigger the movement 121, 521 of at least the part 120m of the assembly 120 by triggering a release of the releasable latch.

In example 22, the vehicle 100 of example 20 may further include that the spring mechanism 402 includes at least one first spring 402s-1 to generate a first spring force to move 121 at least the part 120m of the assembly 120 from the first position 123a to the second position 123b and at least one second spring 402s-2 to generate a second spring force to move 421 at least the part 120m of the assembly 120 from the first position 123a to a third position 423a. The spring mechanism may include a release structure 404-1, 404-2 configured either to release the at least one first spring 402s-1 to move 421 at least the part 120m of the assembly 120 from the first position 123a to the third position 423a via the at least one second spring 402s-2 or to release the at least one second spring 402s-2 to move 121 at least the part 120m of the assembly 120 from the first position 123a to the second position 123b via the at least one first spring 402s-1. The spring mechanism 402 may be further configured to hold at least the part 120m of the assembly 120 in the first position 123a until either the at least one first spring 402s-1 or the at least one second spring 402s-2 is released. The one or more processors 140, 540 may be configured to trigger the movement 121, 421, 521 of at least the part 120m of the assembly 120 by triggering a release of the release structure 404-1, 404-2.

In example 23, the vehicle 100 of any one of examples 1 to 22 may further include: an electric motor 202 configured to drive the movement 121 of at least the part 120m of the assembly 120 from the first position 123a into the second position 123b and/or from the second position 123b into the first position 123a. The electric motor 202 may be configured to drive the movement 121 of at least the part 120m of the assembly 120 from the first position 123a (into an opposite direction) to a third position and/or from the third position into the first position 123a.

In example 24, the vehicle 100 of example 23 may further include that the one or more processors 140, 540 are configured to trigger the movement 121, 521 of at least the part 120m of the assembly 120 by controlling the electric motor.

Example 25 is a vehicle 100, including: a side mirror assembly 520; one or more range imaging sensors 530 integrated into the side mirror assembly 520, wherein the one or more range imaging sensors 530 are configured to receive obstacle information associated with a lateral distance 543a, 543b of one or more obstacles from the side mirror assembly 520; one or more processors 140, 540 configured to compare the lateral distance 543a, 543b with a (e.g., predetermined) lateral safety distance 541a, 541b, and, to trigger a safety operation based on the comparison.

In example 26, the vehicle 100 of example 25 may further include that the one or more processors 140, 540 are configured to trigger the safety operation only in the case that the lateral distance 543a, 543b is equal to or less than the lateral safety distance 541a, 541b.

In example 27, the vehicle 100 of example 26 may further include that the one or more range imaging sensors 530 include at least two cameras configured to generate at least two photographic images taken from different vantage points 529a, 529b.

In example 28, the vehicle 100 of any one of examples 25 to 27 may further include: an infrared illumination device 532 configured to at least partially illuminate a field of vision 500v of the one or more range imaging sensors 530.

In example 29, the vehicle 100 of any one of examples 25 to 28 may further include that the lateral distance 543a, 543b is determined perpendicularly to a longitudinal axis 113 or a central vertical longitudinal plane 600v of the vehicle.

In example 30, the vehicle 100 of any one of examples 25 to 29 may further include that the lateral safety distance is in the range from about 0 centimeter to about 20 centimeters.

In example 31, the vehicle 100 of any one of examples 25 to 30 may further include that a line of vision 533 of the one or more range imaging sensors 530 is aligned in a forward driving direction or a rear driving direction.

In example 32, the vehicle 100 of any one of examples 25 to 31 may further include that the one or more processors 140, 540 are further configured to continue the safety operation during a time period in which the lateral distance 543a, 543b is equal to or less than the lateral safety distance 541a, 541b and to suspend or cancel the safety operation if the lateral distance 543a, 543b increases beyond the lateral safety distance 541a, 541b.

In example 33, the vehicle 100 of any one of examples 25 to 32 may further include that the safety operation includes movement 121, 421, 521 of a side mirror 522 of the side mirror assembly 520 from a first position 123a into a second position 123*b*, wherein a lateral dimension of the side mirror assembly 520 is less in the second position 123*b* than in the first position 123*a*.

In example 34, the vehicle 100 of example 33 may further include that the lateral dimension is defined perpendicularly to a longitudinal axis 113 or a central vertical longitudinal plane 600*v* of the vehicle 100.

In example 35, the vehicle 100 of any one of examples 25 to 34 may further include that the one or more range imaging sensors 530 are further configured to receive distance information associated with a longitudinal distance of one or more obstacles from the side mirror assembly 520. The one or more processors 140, 540 may be further configured to determine a longitudinal distance of the one or more obstacles 131, 531*a*, 531*b* from the side mirror assembly 520, and to trigger the movement 121, 421, 521 of the side mirror 522 from the first position 123*a* into the second position 123*b* only in the case that the determined longitudinal distance is less than or equal to a longitudinal safety distance 151.

In example 36, the vehicle 100 of example 35 may further include that the longitudinal distance is determined in a direction parallel to a longitudinal axis 113 of the vehicle 100.

In example 37, the vehicle 100 of example 35 or 36 may further include that the longitudinal safety distance is in the range from about 1 meter to about 100 meters.

In example 38, the vehicle 100 of any one of examples 25 to 37 may further include that the one or more processors 140, 540 are further configured to trigger the safety operation only in the case that a time period in, which the lateral distance is equal to or less than the lateral safety distance, is greater than or equal to a predetermined time period.

In example 39, the vehicle 100 of example 38 may further include that the predetermined time period is in the range from about 30 milliseconds to about 1000 milliseconds.

Example 40 is a vehicle 600, including: one or more range imaging sensors 630 disposed in a position distanced 630*d* from a central vertical longitudinal plane 600*v* of the vehicle 600 and configured to receive obstacle information associated with a lateral distance 634-1, 634-2 of one or more obstacles 631 from the vehicle 600; one or more processors 640 configured to compare the lateral distance 634-1, 634-2 with a (e.g. predetermined) lateral safety distance 641, and, trigger a safety operation based on the comparison.

In example 41, the vehicle 600 of example 40 may further include that the one or more processors 640 are configured to trigger the safety operation only in the case that the lateral distance 634-1, 634-2 is equal to or less than the lateral safety distance 641.

In example 42, the vehicle 600 of example 40 or 41 may further include that the distance 630*d* of the one or more range imaging sensors 630 from the central vertical longitudinal plane 400*v* of the vehicle 600 is greater than a quarter of a maximum width 612 of the vehicle 600.

Example 43 is a side mirror assembly 520 for a vehicle 100, 600, the side mirror assembly 520 including: a side mirror 522; one or more range imaging sensors 530, wherein the one or more range imaging sensors 530 are configured to receive obstacle information associated with a location P1, P2 of one or more obstacles 131, 531*a*, 531*b*, 631 relative to the side mirror assembly 520.

In example 44, the side mirror assembly 520 of example 43 may further include that the one or more range imaging sensors 530 include at least two cameras configured to generate at least two photographic images taken from different vantage points 529*a*, 529*b*. This allows to associated range information with one or more obstacles in the at least two photographic images. Illustratively, range data (also referred to as depth data) may be associated with one or more pixels of the photographic images.

In example 45, the side mirror assembly 520 of example 43 or 44 may further include: an infrared illumination device 532 configured to at least partially illuminate a field of vision 500*v* of the one or more range imaging sensors 530.

Example 46 is a method for avoiding collision of one or more obstacles 131, 531*a*, 531*b*, 631 with an assembly 120, 520, 620 attached to an external structure 102 of a vehicle 100, 600, the method including: receiving obstacle information associated with the one or more obstacles in a vicinity of the vehicle; predicting a collision threat to the assembly based on the obstacle information, and moving of at least the part of the assembly from a first position into a second position in the case that the collision threat is predicted, wherein the assembly protrudes from the external structure with a first distance in the first position and with a second distance less than the first distance in the second position.

In example 47, the method of example 46 may further include that predicting a collision threat includes: determining a lateral distance of the one or more obstacles 131, 531*a*, 531*b*, 631 from the assembly 120, 520, 620, and in the case that the predicted lateral distance is less than or equal to a lateral safety distance the collision threat is predicted.

In example 48, the method of example 46 or 47 may further include: determining whether the collision threat continues or subsides, and, moving at least the part 120*m*, 522, 524 of the assembly 120, 520, 620 from the second position 123*b* into the first position 123*a* in response to the collision threat subsiding.

Example 49 is a method for operating a vehicle 100, 600, the method including: receiving obstacle information associated with a lateral distance of one or more obstacles from a side mirror assembly 520 of the vehicle; comparing the lateral distance with a (e.g. predetermined) lateral safety distance; and triggering a safety operation based on the comparison.

In example 50, the method of example 49 may further include that the safety operation is only triggered in the case that the lateral distance is equal to or less than the lateral safety distance.

In example 51, the method of example 49 or 50 may further include: continuing the safety operation during a time period in which the lateral distance is equal to or less than the lateral safety distance and suspending or canceling the safety operation if the lateral distance increases beyond the lateral safety distance.

In example 52, the method of any one of examples 49 to 51 may further include that the safety operation includes movement 121, 421, 521 of a side mirror of the side mirror assembly 520 from a first position 123*a* into a second position 123*b*, wherein a lateral dimension of the side mirror assembly 520 is less in the second position 123*b* than in the first position 123*a*.

Example 53 is a vehicle 100 may include: an external structure 102; an assembly 120 attached to the external structure 102, wherein the assembly 120 is configured to allow a movement 121, 421, 521 of at least a part 120*m* of the assembly 120 relative to the external structure 102 at least from a first position 123*a* to a second position 123*b*, wherein the assembly 120 protrudes from the external structure 102 with a first distance 101*a* in the first position 123*a* and with a second distance 101*b* less than the first distance 101*a* in the second position 123*b*; a collision detection system configured to receive obstacle information associated with one or more obstacles 131, 531a, 531b in the vicinity of the vehicle 100 and to predict a collision threat to the assembly 120 based on the obstacle information, and a collision avoidance system configured to trigger the movement 121, 421, 521 of at least the part 120m of the assembly 120 from the first position 123a into the second position 123b in the case that the collision threat is predicted.

Example 54 is a vehicle 100 may include: an external structure 102; an assembly 120 attached to the external structure 102, wherein the assembly 120 is configured to allow a movement 121, 421, 521 of at least a part 120m of the assembly 120 relative to the external structure 102 at least between a first position 123a and a second position 123b, wherein the assembly 120 protrudes from the external structure 102 with a first distance 101a in the first position 123a and with a second distance 101b less than the first distance 101a in the second position 123b; a collision detection system configured to receive obstacle information associated with one or more obstacles 131, 531a, 531b in the vicinity of the vehicle 100 and to predict a collision threat to the assembly 120 based on the obstacle information, and a collision avoidance system configured to trigger a movement 121, 421, 521 of at least the part 120m of the assembly 120 from the first position 123a into the second position 123b in the case that the collision threat is predicted or to prevent a movement of at least the part 120m of the assembly 120 from the second position 123b into the first position 123a. The collision detection system may include one or more sensors, one or more processors, etc. The collision avoidance system may include one or more processors, etc. The collision detection system and the collision avoidance system may share, e.g. the one or more processors.

According to various aspects, the one or more sensors 130 may include one or more receivers to receive data representing the obstacle information. The data may be send by an infrastructure based on a vehicle-to-infrastructure (v-to-x) communication. The data may be send by another vehicle based on a vehicle-to-vehicle (v-to-v) communication. The data may represent, for example, a position information associated with a position of the obstacle (e.g. another vehicle, a bridge, a tunnel, etc.), a dimension (e.g. a height, a width, a length) of the obstacle, a velocity of the obstacle, etc.

According to some aspects, a moving obstacle may approach the vehicle 100. In this case, the one or more processors 140 (or the collision detection system) may be configured to determine a direction of travel (also referred to as course) of the obstacle (e.g. of another vehicle approaching the vehicle 100). The direction of travel of the obstacle may be determined, for example, using a map (e.g. a vocel map) that is generated by sensor data of one or more sensors, e.g. of one or more range imaging sensors. A collision threat to the assembly 120 (e.g. a possible impact of one or more obstacles into the assembly) may be predicted based on the map, e.g. based on a direction of travel of the obstacle relative to the vehicle 100. According to various aspects, an impact may be predicted based on an estimation of a collision point or a collision course, wherein the collision point or collision course may be estimated based on positions and velocities of the respective obstacle and the vehicle 100.

According to various aspects, the term "predict" used herein with respect to "predict a collision", "predict a threat", etc., may be understood as any suitable type of determination of a possible collision, threat, etc.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A collision avoidance device for a vehicle the collision avoidance device comprising:
    an assembly comprising an attachment structure configured to attach the assembly to an external structure of the vehicle,
        wherein the attachment structure is further configured to allow a movement of a part of the assembly from a first position to a second position,
        wherein the assembly is configured to protrude from the external structure to a first distance in the first position,
        wherein the assembly is further configured to protrude from the external structure to a second distance in the second position, and
        wherein the first distance is greater than the second distance;
    one or more sensors configured to generate obstacle information associated with an obstacle in a vicinity of the vehicle; and
    one or more processors configured to:
        determine a lateral distance component of a distance to the obstacle based on the obstacle information,
            wherein the lateral distance component is defined in a lateral direction parallel to a lateral axis associated with a lateral width of the vehicle,
        determine a longitudinal distance component of the distance to the obstacle based on the obstacle information,
            wherein the longitudinal distance component is defined in a longitudinal direction parallel to a longitudinal axis associated with a forward-driving direction of the vehicle,
        determine a collision threat to the assembly based on a first comparison between the lateral distance component and a predetermined lateral safety distance, and further based on a second comparison between the longitudinal distance component and a predetermined longitudinal safety distance, and
        trigger the movement of the part of the assembly from the first position to the second position based on the collision threat to the assembly being determined.

2. The collision avoidance device of claim 1,
    wherein the assembly comprises:
        a side mirror assembly,
        a coupling assembly,
        a door assembly,
        a trunk lid assembly, and/or
        an antenna assembly.

3. The collision avoidance device of claim 1,
    wherein the one or more sensors comprise one or more range imaging sensors.

4. The collision avoidance device of claim 3, further comprising:
    an infrared illumination device configured to illuminate a field of vision of the one or more range imaging sensors.

5. The collision avoidance device of claim 3,
wherein a line of vision of the one or more range imaging sensors is aligned in the forward-driving direction or a rear-driving direction of the vehicle.

6. The collision avoidance device of claim 1,
wherein, after the collision threat to the assembly is determined, the one or more processors are further configured to:
determine the collision threat to the assembly has subsided, and
trigger an additional movement of the part of the assembly from the second position to the first position in response to determining the collision threat to the assembly has subsided.

7. The collision avoidance device of claim 1,
wherein the one or more processors are configured to trigger the movement of the part of the assembly from the first position to the second position only in the case that the collision threat is determined to continue for a time period greater than or equal to a predetermined time period.

8. The collision avoidance device of claim 1, further comprising:
a spring mechanism configured to move the part of the assembly from the first position to the second position.

9. The collision avoidance device of claim 1, further comprising:
an electric motor configured to:
drive the movement of the part of the assembly from the first position to the second position, and/or
drive the movement of the part of the assembly from the second position to the first position.

10. The collision avoidance device of claim 1,
wherein the one or more sensors are configured to generate the obstacle information associated with the obstacle in the vicinity of the vehicle, based on a reception of a vehicle-to-vehicle communication.

11. The collision avoidance device of claim 1,
wherein the first comparison comprises a determination as to whether the lateral distance component is less than or equal to the predetermined lateral safety distance, and
wherein the second comparison comprises a determination as to whether the longitudinal distance component is less than or equal to the predetermined longitudinal safety distance.

12. The collision avoidance device of claim 1,
wherein the first comparison comprises a determination as to whether the lateral distance component is less than or equal to a sum of the predetermined lateral safety distance and a lateral safety tolerance.

13. The collision avoidance device of claim 1,
wherein the lateral axis is perpendicular to the longitudinal axis.

14. A collision avoidance device for a vehicle, the collision avoidance device comprising:
a side mirror assembly;
one or more range imaging sensors integral with the side mirror assembly,
wherein the one or more range imaging sensors are configured to generate obstacle information associated with an obstacle in a vicinity of the vehicle,
wherein the obstacle information is associated with a lateral distance component of a distance to the obstacle, and
wherein the obstacle information is associated with a longitudinal distance component of the distance to the obstacle;
one or more processors configured to:
compare the lateral distance component with a lateral safety distance in a first comparison,
compare the longitudinal distance component with a longitudinal safety distance in a second comparison, and
trigger a safety operation based on the first comparison and the second comparison,
wherein the lateral distance component is defined in a lateral direction parallel to a lateral axis associated with a lateral width of the vehicle, and
wherein the longitudinal distance component is defined in a longitudinal direction parallel to a longitudinal axis associated with a forward-driving direction of the vehicle.

15. The collision avoidance device of claim 14,
wherein the safety operation comprises a movement of a side mirror of the side mirror assembly from a first position to a second position,
wherein a lateral dimension of the side mirror assembly is less in the second position than a lateral dimension of the side mirror assembly in the first position.

16. The collision avoidance device of claim 14,
wherein the one or more processors are further configured to select the longitudinal safety distance, such that the movement of the part of the assembly from the first position to the second position is completed before the obstacle can collide with the assembly.

17. A vehicle having a longitudinal axis associated with a forward-driving direction of the vehicle, and having a lateral axis associated with a lateral width of the vehicle, the vehicle comprising:
one or more range imaging sensors located at a position distanced from a central vertical longitudinal plane of the vehicle,
wherein the one or more range imaging sensors are configured to generate obstacle information associated with an obstacle in a vicinity of the vehicle,
wherein the obstacle information is associated with a lateral distance component of a distance to the obstacle, and
wherein the obstacle information is associated with a longitudinal distance component of the distance to the obstacle;
one or more processors configured to:
compare the lateral distance component with a lateral safety distance in a first comparison,
compare the longitudinal distance component with a longitudinal safety distance in a second comparison, and
trigger a safety operation based on the first comparison and the second comparison,
wherein the lateral distance component is defined in a lateral direction parallel to the lateral axis, and
wherein the longitudinal distance component is defined in a longitudinal direction parallel to the longitudinal axis.

18. The vehicle of claim 17,
wherein the one or more processors are configured to trigger the safety operation only in the case that the lateral distance component is less than or equal to the lateral safety distance and the longitudinal distance component is less than or equal to the longitudinal safety distance.

19. The vehicle of claim 17,
wherein a distance of the one or more range imaging sensors from the central vertical longitudinal plane of the vehicle is greater than a quarter of the lateral width of the vehicle.

20. The vehicle of claim 17,
wherein the safety operation comprises:
- a movement of a part of a side mirror assembly of the vehicle,
- a stopping the vehicle, or
- a generation of an alarm.

* * * * *